(12) United States Patent
Dresen et al.

(10) Patent No.: US 10,927,909 B2
(45) Date of Patent: Feb. 23, 2021

(54) BRAKE LINING OF A DISK BRAKE AND BRAKE PAD SET

(71) Applicant: KNORR-BREMSE Systeme fuer Nutzfahrzeuge GmbH, Munich (DE)

(72) Inventors: Dirk Dresen, Leverkusen (DE); Josef Schropp, Eichendorf (DE); Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 109 days.

(21) Appl. No.: 16/112,181

(22) Filed: Aug. 24, 2018

(65) Prior Publication Data

US 2018/0363718 A1 Dec. 20, 2018

Related U.S. Application Data

(63) Continuation of application No. PCT/EP2017/053887, filed on Feb. 21, 2017.

(30) Foreign Application Priority Data

Feb. 26, 2016 (DE) .................. 10 2016 103 396.0

(51) Int. Cl.
  *F16D 65/095* (2006.01)
  *F16D 69/04* (2006.01)
  *F16D 65/092* (2006.01)
  *F16D 69/00* (2006.01)

(52) U.S. Cl.
  CPC ......... *F16D 65/095* (2013.01); *F16D 65/092* (2013.01); *F16D 69/0408* (2013.01); *F16D 2069/004* (2013.01); *F16D 2069/0441* (2013.01)

(58) Field of Classification Search
  CPC ...... F16D 65/092; F16D 65/095; F16D 69/04; F16D 69/0408; F16D 69/0441
  USPC .............................. 188/250 R, 250 B, 250 G
  See application file for complete search history.

(56) References Cited

U.S. PATENT DOCUMENTS

| | | | |
|---|---|---|---|
| 1,891,186 A * | 12/1932 | Ogren | ...................... F16D 69/02 188/234 |
| 5,355,986 A | 10/1994 | Biswas | |
| 6,257,674 B1 * | 7/2001 | Dagh | ...................... B60B 27/02 188/264 A |

(Continued)

FOREIGN PATENT DOCUMENTS

| | | | |
|---|---|---|---|
| CN | 203161926 U | 8/2013 | |
| DE | 2427694 A1 * | 12/1975 | ........... F16D 65/092 |

(Continued)

OTHER PUBLICATIONS

Chinese-language Office Action issued in counterpart Chinese Application No. 201780025196.1 dated Aug. 27, 2019 with English translation (21 pages).

(Continued)

*Primary Examiner* — Thomas J Williams
(74) *Attorney, Agent, or Firm* — Crowell & Moring LLP

(57) ABSTRACT

A brake pad for a disk brake for a utility vehicle, includes a pad backplate, which has a pad side with a frictional mass and an application side opposite the pad side. The pad side is provided with a structural arrangement having a plurality of recesses with elevations arranged therein. The structural arrangement of the pad side comprises structural elements which differ in shape and size.

48 Claims, 21 Drawing Sheets

(56) References Cited

U.S. PATENT DOCUMENTS

| | | |
|---|---|---|
| 6,279,222 B1 | 8/2001 | Bunker et al. |
| 6,367,600 B1 | 4/2002 | Arbesman |
| 9,920,807 B2 | 3/2018 | Borgmeier et al. |
| 10,724,588 B2 * | 7/2020 | Signoriello ......... F16D 65/0006 |
| 2009/0020380 A1 | 1/2009 | Camilo-Martinez et al. |
| 2009/0026028 A1 | 1/2009 | Gasslbauer |
| 2013/0277160 A1 | 10/2013 | Dreher et al. |
| 2017/0067521 A1 * | 3/2017 | Rangoni ............... F16D 65/092 |

FOREIGN PATENT DOCUMENTS

| | | | |
|---|---|---|---|
| DE | 195 32 019 C1 | 2/1997 | |
| DE | 103 02 334 A1 | 8/2004 | |
| DE | 102004051046 A1 * | 5/2006 | ......... F16D 69/0408 |
| DE | 10 2005 028 796 A1 | 12/2006 | |
| DE | 10 2006 034 764 A1 | 6/2007 | |
| DE | 10 2008 003 529 B4 | 2/2010 | |
| DE | 10 2011 001 562 A1 | 9/2012 | |
| DE | 10 2011 118 127 B4 | 4/2015 | |
| DE | 10 2014 117 652 A1 | 6/2015 | |
| EP | 0 566 008 A1 | 10/1993 | |
| EP | 0760436 B1 * | 3/2000 | ........... F16D 65/092 |
| EP | 0 731 288 B1 | 9/2000 | |
| EP | 2 083 187 A1 | 7/2009 | |
| EP | 1 982 091 B1 | 12/2010 | |
| EP | 2 459 898 B1 | 4/2013 | |
| GB | 2245667 A * | 1/1992 | ......... F16D 69/0408 |
| GB | 2 303 891 A | 3/1997 | |
| WO | WO 97/06370 A | 2/1997 | |
| WO | WO 2015/181695 A1 | 12/2015 | |

OTHER PUBLICATIONS

International Search Report (PCT/ISA/210) issued in PCT Application No. PCT/EP2017/053887 dated Sep. 6, 2017 with English translation (nine (9) pages).
German-language Written Opinion (PCT/ISA/237) issued in PCT Application No. PCT/EP2017/053887 dated Sep. 6, 2017 (nine (9) pages).
German-language Office Action issued in counterpart German Application No. 10 2016 103 396.0 dated Mar. 1, 2017 (seven (7) pages).
International Preliminary Report on Patentability (PCT/IB/326 & PCT/IB/373) issued in PCT Application No. PCT/EP2014/053887 dated Sep. 6, 2017, including English translation of document C2 (Japanese-language Written Opinion (PCT/ISA/237) previously filed on Aug. 24, 208) (11 pages).

* cited by examiner

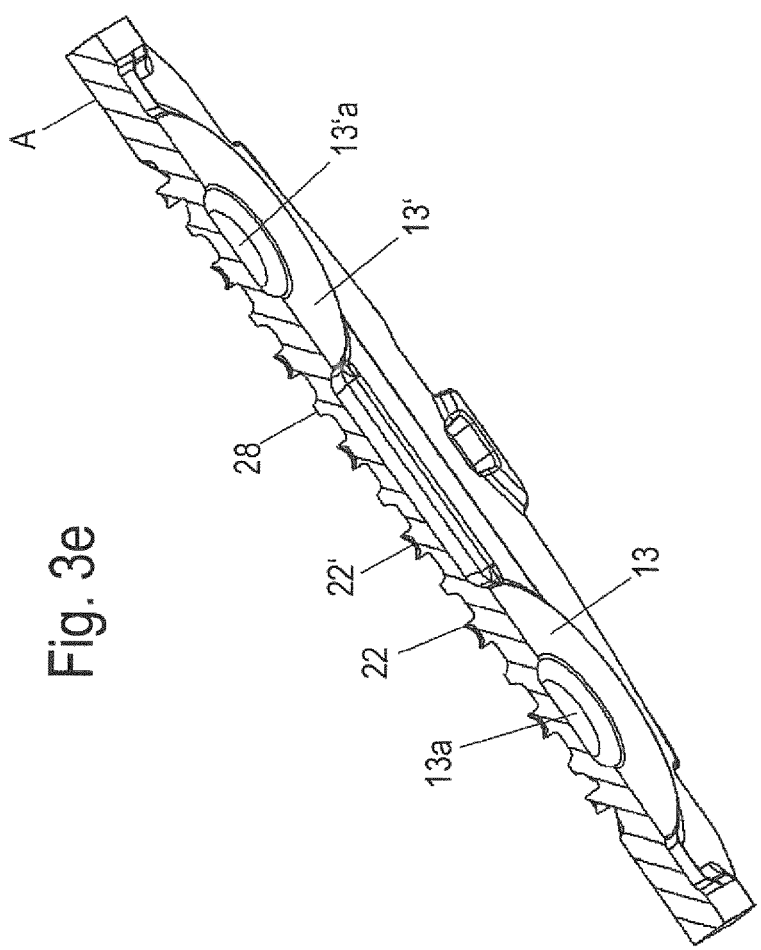

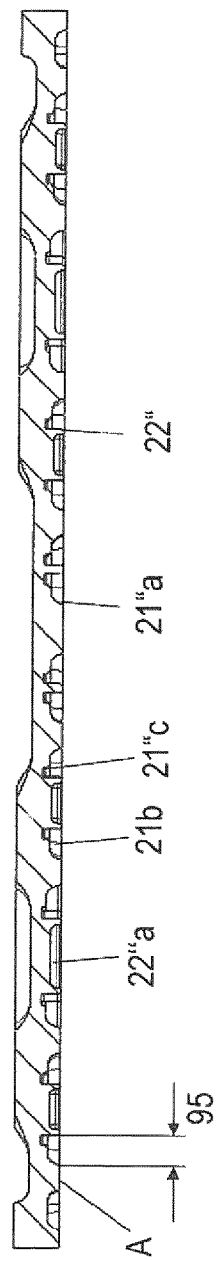

BRAKE LINING OF A DISK BRAKE AND BRAKE PAD SET

CROSS REFERENCE TO RELATED APPLICATIONS

This application is a continuation of PCT International Application No. PCT/EP2017/053887, filed Feb. 21, 2017, which claims priority under 35 U.S.C. § 119 from German Patent Application No. 10 2016 103 396.0, filed Feb. 26, 2016, the entire disclosures of which are herein expressly incorporated by reference.

BACKGROUND AND SUMMARY OF THE INVENTION

The present invention relates to a brake pad of a disk brake according to the preamble of claim 1. The invention also relates to a brake pad set for a disk brake.

Brake pads of this type are used in disk brakes. Disk brakes are used in particular in utility vehicles and are frequently provided with pneumatic actuation. One embodiment of the brake caliper of disk brakes of this type is designed as a sliding caliper and is used, for example, in a constricted constructional space.

There is a constant challenge to save on fuel in vehicles. One possibility in this connection resides in reducing the weight of a disk brake since said disk brake is present on all of the wheels of a vehicle.

Numerous proposals have already been made for this purpose. Some example for illustration are mentioned below. DE 10 2011 118 127 B4 describes a brake pad with a flexurally rigid core. EP 2 459 898 B1 relates to a brake pad with a pad carrier plate which is in the form of a cast part and has raised, integrally formed form-fitting parts which are surrounded by a frictional mass for the securing of said brake pad. A method for producing a brake pad by the formation of projections is indicated in EP 0 731 288 B1. DE 10 2008 003 529 B4 describes a brake pad for a disk brake with ribs and shaping means which correspond to the frictional mass with the effect of a form fit.

WO 97/06370 A shows various variant embodiments of a pad back carrier, in which either depressions or elevations are formed on the pad side on the surface of the pad backplate. The anchoring of the frictional mass on the pad backplate appears to be problematic here. Many illustrations thus show webs with undercuts or elevations with lateral undercuts. In particular, the dimensioning of the webs appears to be very thin, and therefore they can only offer little resistance to lateral forces and gravitational forces.

EP 1 982 091 B1 discloses a brake pad comprising a pad backplate with a structural arrangement which is formed by a depression in which a multiplicity of elevations of identical shape and geometry are arranged. Said brake pad has been tried and tested, but the stability and strength of the connection of the pad backplate to the frictional mass should be additionally increased.

Against the background of these solutions, there is furthermore a constant need to save on fuel by reducing weight while simultaneously extending the service life of brakes and brake components without reducing strength and stability.

The invention is therefore based on the object of indicating an improved brake pad for a disk brake.

It is a further object to provide an improved brake pad set for a disk brake.

The invention achieves this object by the subject matter of claim 1. Particular variants are presented in claims 48 to 54.

The object is also achieved by the subject matter of claim 55.

Accordingly, a brake pad of a disk brake for a motor vehicle, in particular for a utility vehicle, comprises a pad backplate, which has a pad side with a frictional mass and an application side opposite the pad side, wherein the pad side is provided with a structural arrangement having a plurality of recesses and elevations arranged therein. The structural arrangement of the pad side comprises structural elements which differ in shape and size.

The recesses and elevations are preferably part of the structural elements of the structural arrangement.

It has been shown that the stability in relation to lateral and shearing forces increases in comparison to WO 97/06370 A and EP 1 982 091 B1 if a plurality of depressions with elevations arranged therein are provided, wherein the structural elements, in particular the depressions and/or elevations, vary in shape and size.

Since the density, area and thickness of the frictional mass is not very variable, if a predetermined braking action and service life are intended to be achieved, the advantage consists in that a weight reduction is made possible by means of the structural elements on the pad backplate. Since said structural elements are produced not only differently in shape and size, but also are placed in a certain arrangement at a corresponding point, the strength and therefore the service life can be maintained. In addition, the advantage of reducing costs is afforded by saving on material.

In one embodiment, a first group, or all, of the structural elements, which differ in shape and size, is or are arranged in two straight rows, which run parallel to a longitudinal direction of the pad backplate, and in an arrangement running around said rows. The arrangement and the shape and size are based on a determined force progression in the pad backplate.

In a further embodiment, the structural elements in the two straight rows and in the arrangement running around said rows are arranged in an arrangement which is symmetrical with respect to an axis which runs perpendicularly to the longitudinal direction of the pad backplate. Both a shaping and an arrangement which are optimized in terms of noise to the force progression which occurs and also to the occurring excitation frequencies with respect to vibration behavior are therefore possible.

In a preferred embodiment, it is provided that the one row has three hexagonal honeycomb structural elements next to one another, wherein, in the row lying thereunder, at least two further honeycomb structural elements are arranged in such a manner that a type of honeycomb structure results. Connecting webs which can serve as reinforcing ribs are formed here under the honeycomb structural elements.

In an alternative embodiment, the structural arrangement has a first group of structural elements of the structural elements, which differ in shape and size, which are arranged around a central structural element of the structural elements, which differ in shape and size. Forces which occur can therefore be advantageously distributed, wherein a weight reduction is possible at the same time.

Alternatively or additionally, the structural elements, which differ in shape and size, can be arranged in two groups which symmetrically with respect to an axis, which runs perpendicularly to the longitudinal direction of the pad backplate, on the pad side of the pad backplate. This is advantageous since as symmetrical a distribution of forces as possible is thus possible.

In a further embodiment, the first group of the structural elements is arranged circularly around the central structural element. This results in a simple construction, good distribution of forces and can lower a risk of fracture.

The central structural element can also be of circular design here in order to maintain the simple construction.

In yet another embodiment, the central circular structural element is surrounded by a hub-like annular web portion which, with spoke web portions and a further annular web portion, forms a spoke wheel arrangement, in which the structural elements lie in the intermediate spaces defined by the spoke web portions and annular web portions. The spoke web portions result in reinforcing ribs which contribute to the strength.

If, in an embodiment, a width of the spoke web portions is increased in the radial direction beginning from the annular web portion as far as the respective end of each spoke web portion, the advantage is afforded of good distribution of forces and a reduction in the risk of fracture.

In another embodiment, edge portions of the structural elements that lie on the annular web portions are each of curved design and correspond to the diameter of the respective annular web portion, as a result of which a force progression can be distributed.

In yet another embodiment, it is provided that further structural elements of the structural elements, which differ in shape and size, are provided in edge regions, in the center and in support regions of the brake pad backplate. Regions in which a high force progression can occur are therefore stiffened.

In another embodiment, the structural elements furthermore have pentagonal, square and triangular shapes with rounded corners. Since no sharp-edged corners are produced, force progression jumps with corresponding force peaks can be avoided.

If the elevations are of circular, oval or/and polygonal, e.g. triangular, design and have depressions, both strength can be improved and a connection to the frictional mass can be intensified.

For this purpose, it can also be advantageous that the elevations protrude from a base of a respective recess as far as the height of a respective edge or/and beyond the respective edge. This results in a wide range of adaptation to different use regions.

In one embodiment, the application side of the pad backplate has protruding pressure portions. An advantageous introduction of force by an application device can therefore be permitted, in particular if the protruding pressure portions do not have any sharp edges, but rather rounded transitions.

A further increase of strength and service life can result if the pressure portions protruding from the application side are connected by at least one web portion. The progression of the web portions can advantageously be adapted to a determined force progression, e.g. in an embodiment in which the at least one web portion runs rectilinearly and parallel to a longitudinal direction of the pad backplate. However, curved progressions are also possible.

If the pressure portions are of circular ring-shaped design with a recess, further weight can be saved.

In another embodiment, the pressure portions are each divided into two semicircular annular segment pressure portions, in the center of which a circular depression is in each case formed, said depression communicating on both sides with a respective rectilinear depression between the associated annular segment pressure portions. A further reduction in weight is produced here while the strength is simultaneously maintained.

For an adapted advantageous force progression, the rectilinear depressions can run in an imaginary straight connecting line in the longitudinal direction of the pad backplate through center points of the annular segment pressure portions.

In yet another embodiment, the application side has contact strip portions and supporting strip portions. It is therefore possible to stiffen said regions and simultaneously also to increase contact surfaces and supporting surface, i.e. to improve a transmission of forces which occur.

For a further advantageous refinement and distribution of force, the contact strip portions can be connected to the pressure portions or to the annular segment pressure portions.

It is advantageous if the pad backplate is produced integrally from a metallic casting since additional parts which would have to be fitted subsequently can therefore be omitted.

A brake pad set for a disk brake for a vehicle, in particular for a utility vehicle, comprises at least one application-side brake pad and at least one back-side brake pad, wherein the application-side brake pad is formed in the same way as the brake pad described above.

The webs of the structural arrangement will be characterized in more detail below. They are ideally intended to have good resistance in relation to lateral forces and at the same time, however, also has a good possibility for anchoring the frictional mass. At the same time, the dimensioning is intended to contribute to a reduction in weight of the brake pad. Furthermore, shearing off of the frictional mass is intended to be prevented by as large a surface as possible. The variant embodiments below afford substantial optimizations here individually or in combination.

It is of advantage if the ratio x/y is at least 0.25, preferably between 0.3 to 0.6, wherein x is the depth of a recess of the structural arrangement, preferably of all of the recess of the structural arrangement, or the height at which webs of the structural arrangement protrude from the recesses, and y is the thickness of the pad backplate.

The thickness of the pad backplate can preferably be 6 mm at a height of the webs or a depth of the recesses of 2.5 mm.

Since the pad backplate can have projections, depressions, elevations, recesses and the like, the thickness of the pad backplate is defined by the application-side and pad-side surfaces which form the major part of the edge-side region outside the structural arrangement.

The width of at least 50% of all of the webs of the structural arrangement, in particular of at least 50% of all of the webs with a uniform length, is at least 1.8 mm, preferably 2-4 mm.

The length of at least 50% of all of the webs of the structural arrangement, in particular of at least 50% of all of the webs of the structural arrangement with a uniform width, can advantageously be at least 7 mm, preferably 8-17 mm. The length of a web is determined here starting from the intersecting points of the longitudinal axis of the respective web with the longitudinal axes of further webs.

At least 50% of the webs can have a width along a portion of at least 50% of their main direction of extent, which width is between 150 to 300% of the thickness of the pad backplate and/or between 70-130% of the depth of the recess.

The length of at least 50% of all of the webs can be, along their main direction of extent, between 120% to 300% of the thickness of the pad backplate and/or between 250% and 700% of the depth of the recess.

At least 50% of all of the webs can advantageously have a uniform length.

The number of structural elements can be more than 8 per 100 cm$^2$ of frictional surface, preferably more than 10.

Furthermore, the shape of the recesses and the shape of the elevations which are preferably arranged in the recesses will be explained in more detail below.

The structural elements are designed as the recesses, wherein the recesses have the elevations which, in a top view perpendicular to the plane of the surface of the pad backplate, take up between 15 to 50%, in particular between 20% to 30%, of the area of the recess.

The recess can advantageously has a maximum depth t1 by which it is lowered in relation to the plane of the surface, wherein maximum depth is between 20 to 60%, in particular between 30 to 50%, of the thickness of the pad back disk.

The elevations can advantageously have a height by which they protrude, preferably perpendicularly, from the base surface of the recess, wherein the height is between 80% to 180%, in particular 120% to 165%, of the depth.

The configuration of the application side will be explained in more detail below.

A web portion on the application side can run as the first web portion between the pressure portions with a web width which is between 40% to 55% of an outer radius of one of the pressure portions.

In addition, a second web portion can advantageously run between the pressure portions and can be arranged mirror-symmetrically with respect to the first web portion, with reference to an imaginary center axis M. As a result, higher mechanical stability can be achieved.

The second web portion can advantageously have a width of at least 90%, preferably between 95 to 105%, of the first web portion in order to increase the stability.

The surface of the pad side of the brake pad backplate can advantageously form an edge region running around the structural arrangement.

The edge region on all of the portions can advantageously have a minimum width of at least 3 mm, preferably 4-12 mm.

At least one elevation, in particular at least 50% of all of the elevations, of the structural arrangement can in each case have at least one depression, in particular a depression arranged centrally in the elevation. This improves the anchoring of the frictional mass.

Each elevation can advantageously have the geometrical shape of the respective recess in which the elevation is arranged. This can preferably take place in such a manner that the elevation is spaced apart at a constant distance from the edge of the recess.

A maximum of two elevations are arranged in each recesses, but preferably a maximum of one elevation is arranged therein.

Unlike in WO 97/06370 A, in which either only a very few webs and recesses are shown, or, however, webs which are of very narrow design, the recesses can advantageously take up less than 85%, preferably between 55-80%, and particularly advantageously between 70-78% of the surface of the structural arrangement in the top view of the pad side. The rest of the surface is assigned to the webs, i.e. to the end surfaces thereof. If edge surfaces of the recesses are visible in the two-dimensional top view, they are assigned to the recesses. In the top view, additional surfaces which arise by means of height differences and because of the three-dimensional construction of the pad backplate, are omitted, and instead only the two-dimensional surface of the pad side is seen which constitutes in the case of a view in the application direction.

The recesses here can take up less than 90%, preferably between 70-88%, in particular between 80-85%, of the surface of the pad backplate in the top view of the pad side.

The structural arrangement can take up more than 65%, preferably between 68% to 75%, of the surface of the pad backplate in the top view of the pad side. The rest of the surface of the pad backplate is assigned to an edge region which correspondingly provides for additional stability of the pad backplate.

For optimum coordination with impinging transverse forces, the elevations can advantageously have at least two different geometrical shapes and/or dimensions.

The symmetry of the geometrical shape of a first elevation is different from the symmetry of the geometrical shape of a second elevation, wherein the two elevations are part of the structural arrangement.

The elevations can thus have a different width, parallel to the plane of the plate.

The elevations can be present in a rotationally symmetrical or axially symmetrical manner. In the case of polygonal elevations, these are axially symmetrical elevations and, in the case of cylindrical elevations, these are rotationally symmetrical elevations. In a corresponding manner, the depressions provided in the elevations can advantageously also have differing dimensioning and/or geometry.

Unlike the webs, the elevations do not have any connection with the edge of the recess. Each elevation therefore has a minimum distance from the one edge bounding the recess.

Said minimum distance can preferably be at least 50%, particularly preferably 80-400%, of the depth of the recess.

The following variants of a brake pad should be particularly emphasized within the scope of the present invention:

A first brake pad according to the invention of a disk brake for a motor vehicle, in particular for a utility vehicle, in particular a brake pad according to the invention, has a pad backplate, which has a pad side with a frictional mass and an application side opposite the pad side, wherein the pad side is provided with a structural arrangement with recesses and elevations, for the form-fitting connection to the frictional material.

The first brake pad according to the invention is configured here for disk brakes with a braking torque of at maximum 30 kNm, wherein the brake pad has a frictional surface of more than 180 cm$^2$, in particular 189 cm$^2$, and a weight of the pad backplate of less than 1100 g, in particular of 1050 g.

The second brake pad according to the invention is configured for disk brakes with a braking torque of at maximum 24 kNm, wherein the brake pad has a frictional surface of more than 160 cm$^2$, in particular 164 cm$^2$, and a weight of the pad backplate of less than 1050 g, in particular 1000 g.

The third brake pad according to the invention is configured for disk brakes with a braking torque of at maximum 20 kNm. The frictional surface of the brake pad is more than 155 cm$^2$, in particular 161 cm$^2$, and the weight of the pad backplate is less than 1050 g, in particular 1000 g.

The fourth brake pad according to the invention is configured for disk brakes with a braking torque of at maximum 19 kNm and has a frictional surface of more than 150 cm$^2$, in particular 154-161 cm$^2$, and a weight of the pad backplate of less than 1050 g, in particular 1000 g.

The fourth brake pad according to the invention is configured for disk brakes with a braking torque of a maximum of 19 kNm and has a frictional surface of the brake pad of more than 140 cm², in particular 142.5 cm², and a weight of the pad backplate of less than 1000 g, in particular 950 g.

The fifth brake pad according to the invention is configured for disk brakes with a braking torque of a maximum of 13 kNm and has a frictional surface of the brake pad of more than 110 cm², in particular 115 cm², and a weight of the pad backplate of less than 950 g, in particular 900 g.

The sixth brake pad is configured for disk brakes with a braking torque of a maximum of 30 kNm and has a frictional surface of the brake pad of more than 185 cm², in particular 200.7 cm², and a weight of the pad backplate of less than 1250 g, in particular 1200 g.

The aforementioned frictional surface in the brake pads according to the invention refers to a surface having average wear, i.e. when the pad is half worn.

All of the aforementioned brake pads are based on the standard inventive concept of providing a brake pad with reduced weight by provision of a structural arrangement. Depending on the braking torques and frictional surfaces which are required, other weights can be realized within the scope of the present invention.

Exemplary embodiments of a brake pad according to the invention and of a brake pad set according to the invention are illustrated in the drawings and will be described in more detail below, wherein further advantages of embodiments according to the invention will also be explained. In the drawings:

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 3c-e show further views and sectional views of the pad backplates of FIG. 2.

FIG. 7b shows a schematic perspective view of a modification of the pad backplate of FIG. 7a.

FIGS. 8a-8e show a plurality of schematic views and sectional views of the pad side of a second variant of the pad backplate according to FIG. 3.

DETAILED DESCRIPTION OF THE DRAWINGS

Terms such as "top", "bottom", "right", "left", etc. relate to orientations and arrangements in the figures.

Figure 1:
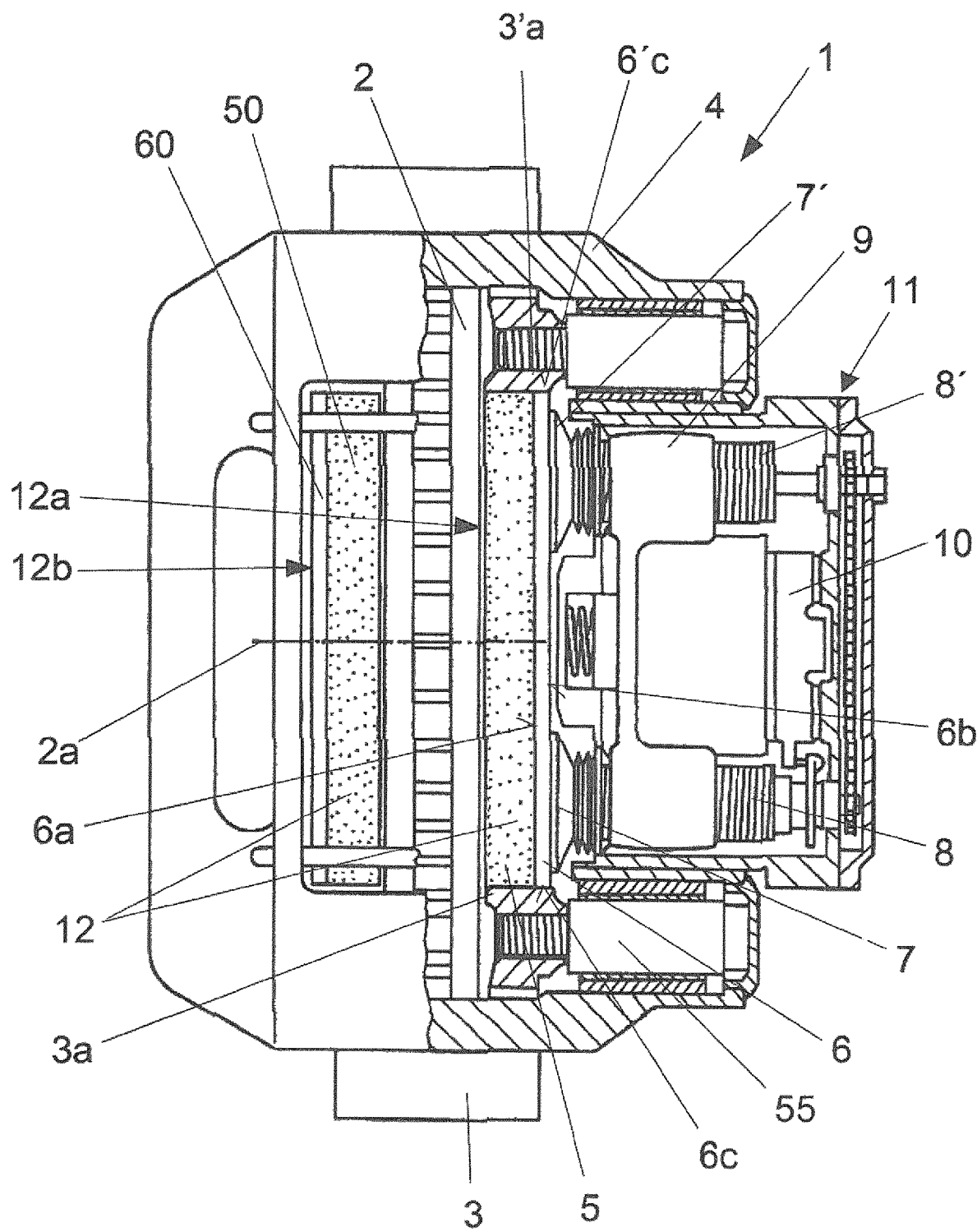
FIG. 1 shows a schematic partial sectional view of a disk brake.

FIG. 1 shows a schematic partial sectional view of a disk brake 1, for example a pneumatic disk brake 1.

The disk brake 1 is, for example, part of the brake system of a vehicle, in particular a utility vehicle, and comprises the brake disk 2 with a brake disk axis of rotation 2a, a brake carrier 3, a brake caliper 4, and a brake pad set 12 with two brake pads 12a and 12b which are arranged on either side of the brake disk 2.

The brake pads 12a, 12b are acted upon during a braking operation with an application force by means of an application device 11, which is arranged in a portion of the brake caliper 4 (on the right side in FIG. 1), as a result of which they are pressed onto the brake disk 2. One or more bearings 55 for the axial displaceability of the brake caliper in relation to the brake disk can be arranged in one or more further portions, preferably on the edge side with respect to the application device 11.

The application device 11 here comprises two brake plungers 8, 8', which are screwed into a crosspiece 9, and a brake rotary lever 10, which interacts with the crosspiece 9 in order to overcome the working stroke. On account of the two brake plungers 8, 8', the disk brake 1 is a two-plunger disk brake 1. The brake plungers 8, 8' interact with the brake pad 12a, which is also called the application-side brake pad 12a. The respective brake plunger 8, 8' can be designed as an adjustable spindle unit with at least one readjustment spindle in each case. The other brake pad 12b is called the back-side brake pad. With regard to the construction and manner of operation of a disk brake 1 actuated by compressed air, reference is made to the document EP 0 566 008 A1.

The application-side brake pad 12a has a frictional mass 5 and a pad backplate 6. The frictional mass 5 is applied on a pad side 6a of the pad backplate 6 and faces the brake disk 2. The other side of the pad backplate 6 is referred to here as the application side 6b and faces the application device 11. The application device 11 is in each case in contact by means of a brake plunger 8, 8' via a respective pressure piece 7, 7' with the application side 6b of the pad backplate 6 of the application-side brake pad 12a.

During braking operations, the application-side brake pad 12a is acted upon with an application force in the direction of the brake disk axis of rotation 2a by the application device 11. The back-side brake pad 12b is received in a back portion (not denoted specifically) of the brake caliper 4 and has a frictional mass 50 and a pad backplate 60.

The brake pads 12a, 12b are in each case accommodated in the brake carrier 5 in a pad slot between two brake carrier horns in each case and are held in the brake carrier 5. This will be described specifically for the application-side brake pad 12a below. In this case, the application-side brake pad 12a is held with its pad backplate 6 in the brake carrier 3 between two brake carrier horns 3a and 3'a so as to be displaceable in the direction of the brake disk axis of rotation 2a. The brake carrier horns 3a, 3'a protrude from the brake carrier 3 vertically upward out of the plane of the drawing of FIG. 1. The pad backplate 6 contacts the inner sides of the brake carrier horns 3a, 3'a in each case by means of a lateral contact surface 6c, 6'c.

The application-side brake pad 12a is in contact in its pad slot with supporting surfaces 6d, 6'd (see FIG. 2) having correspondingly assigned supports. A pad retaining clip (not shown) serves for securing the brake pads 12a, 12b.

For better orientation, it is assumed here that the disk brake 1 moves from the bottom upward in the plane of the drawing in FIG. 1 during forward travel of the associated vehicle. In the process, the brake disk 2 rotates about its brake disk axis of rotation 2a in a main direction of rotation. That side of the brake caliper 4 which lies at the bottom in FIG. 1 is therefore referred to as the entry side and the upper side of the brake caliper 4 as the exit side. In a corresponding manner, the brake carrier horn 3a is referred to as the entry-side brake carrier horn 3a and the other of the pad slot of the application-side brake pad 12a as the exit-side brake carrier horn 3'a. Unless indicated otherwise, components and assemblies which are assigned to the exit side will be identified below by an apostrophe at the respective reference sign.

Figure 2:
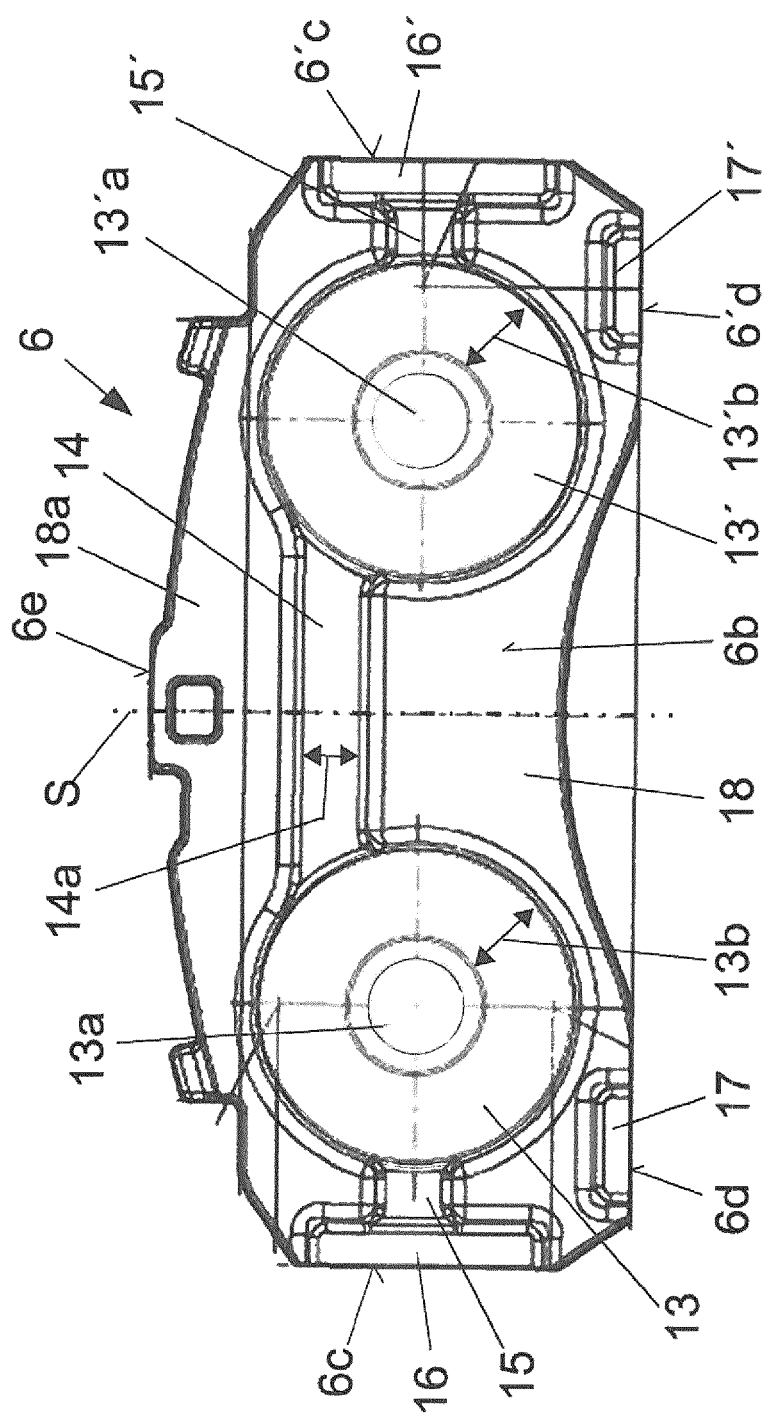
FIG. 2 shows a schematic top view of an application side of an exemplary embodiment of a pad backplate of a brake pad.
Figure 3A:
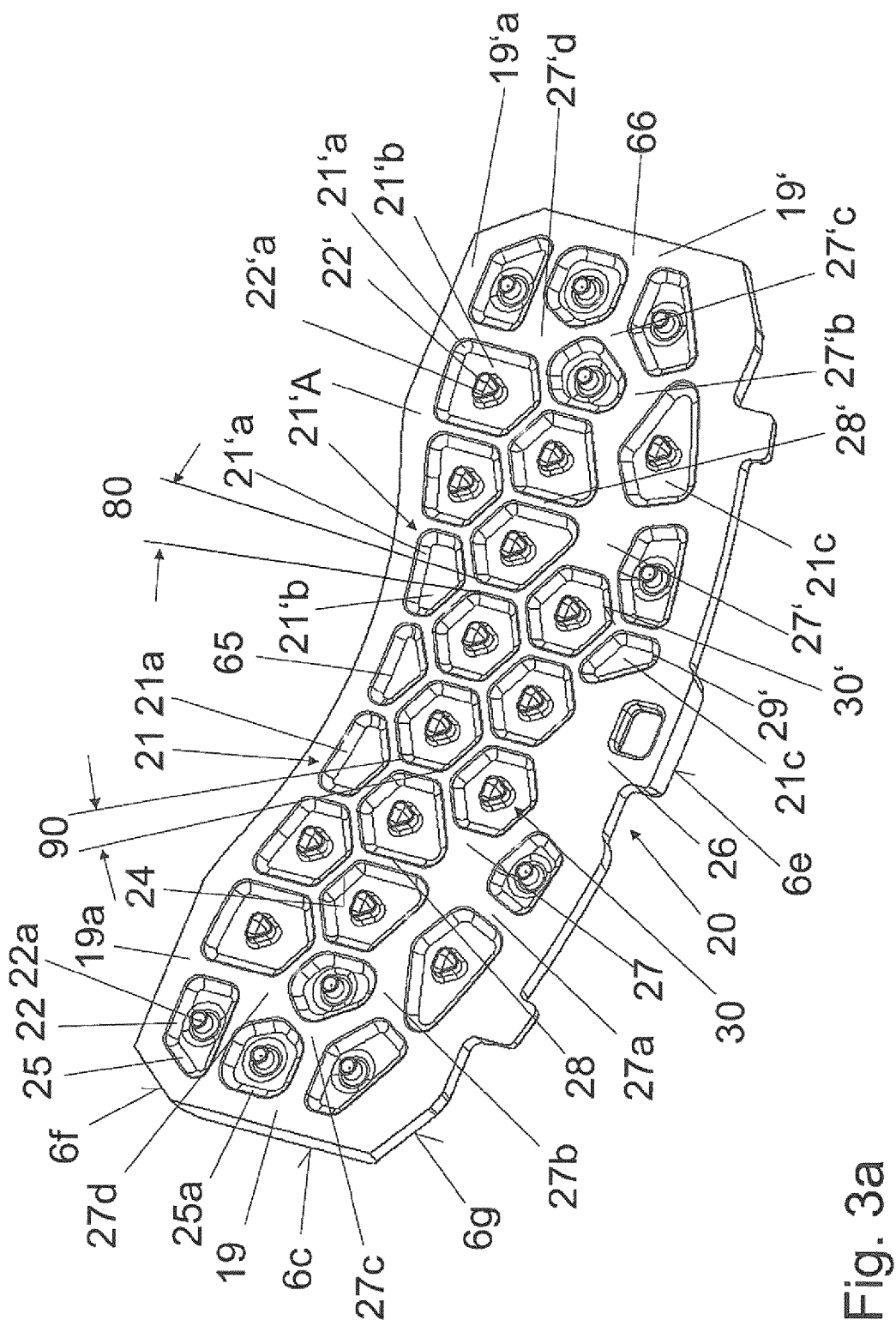
FIGS. 3a, 3b show two perspective views of the pad backplate of FIG. 2.
Figure 3B:
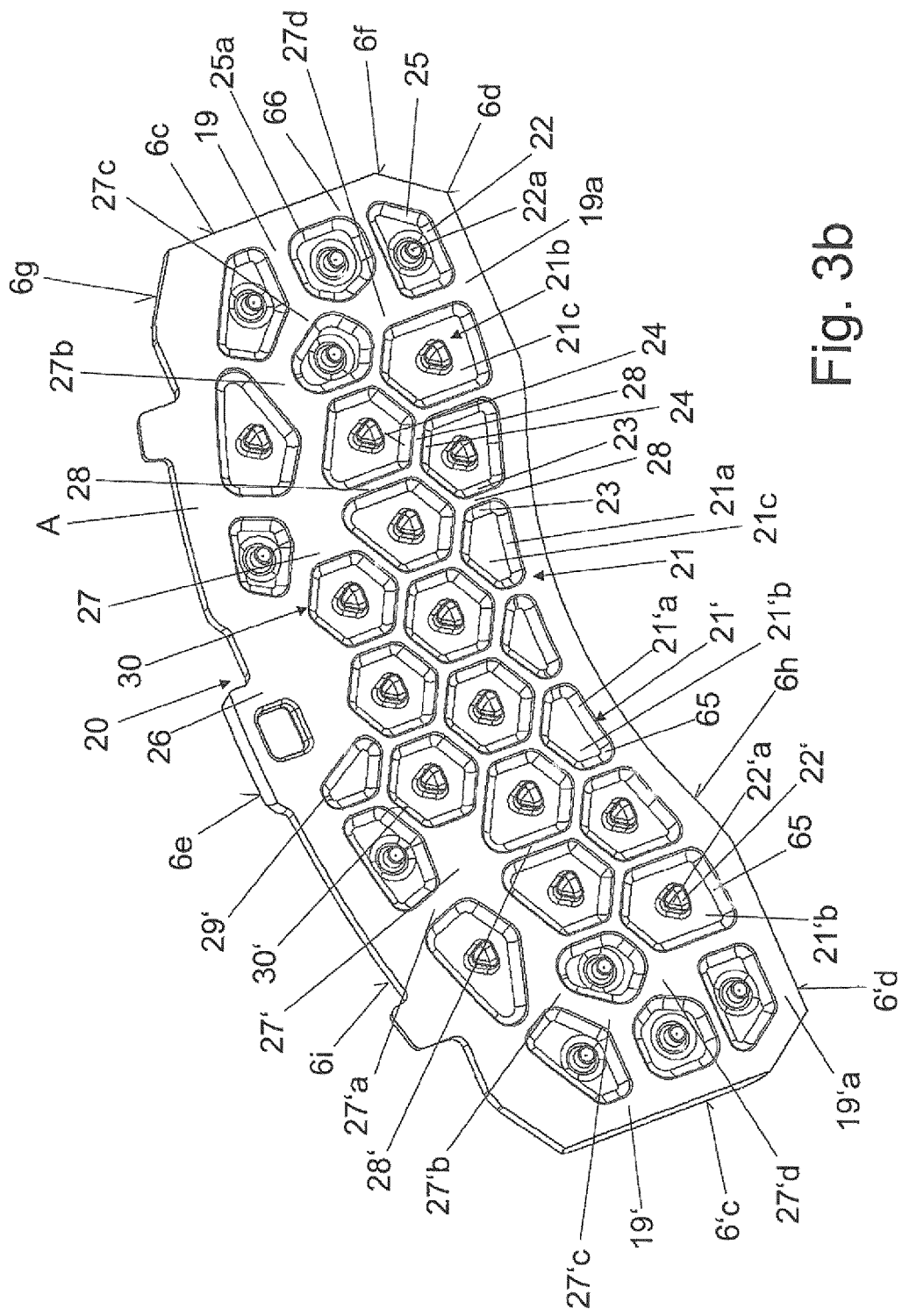
Figure 3C:
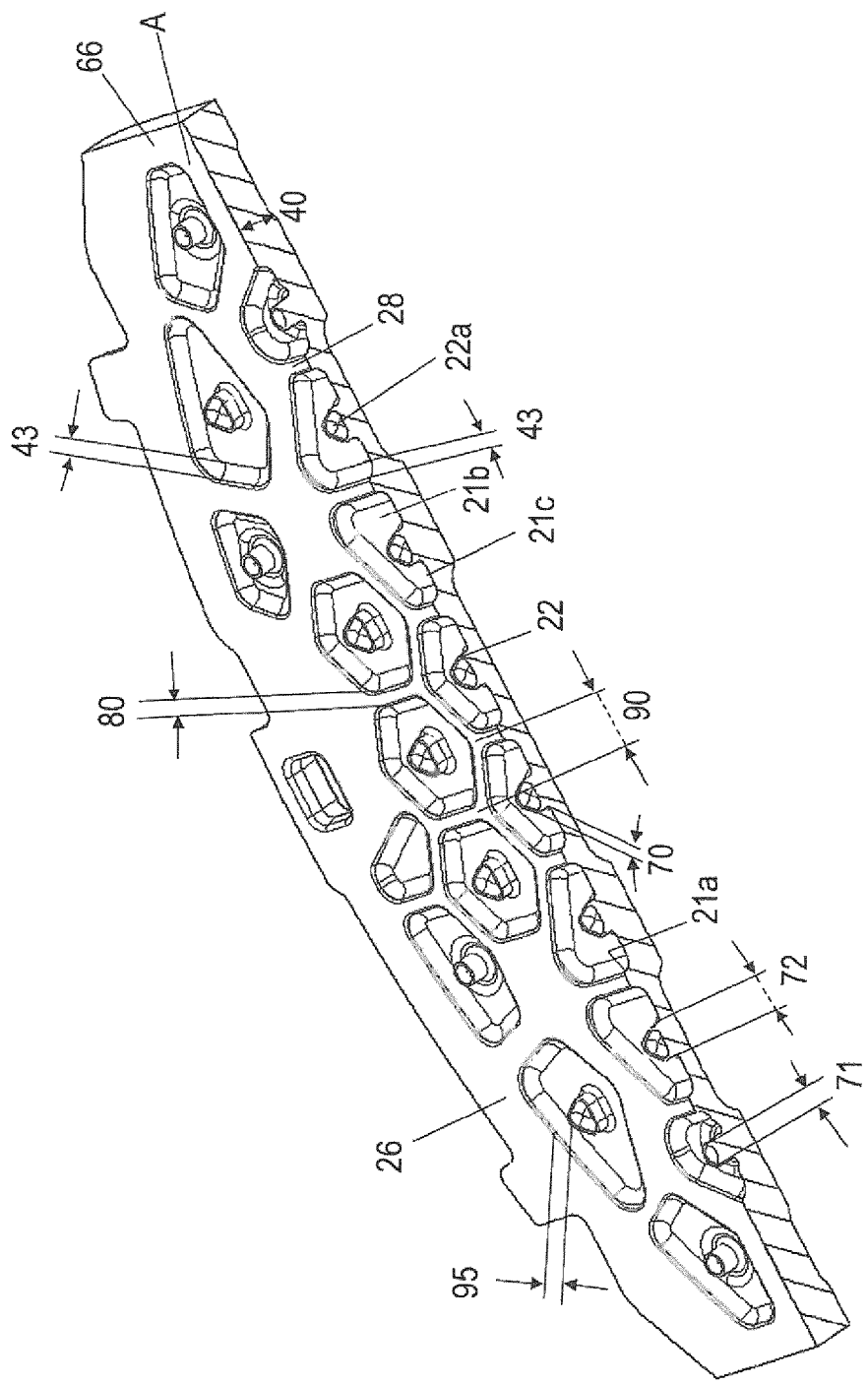
Figure 3D:
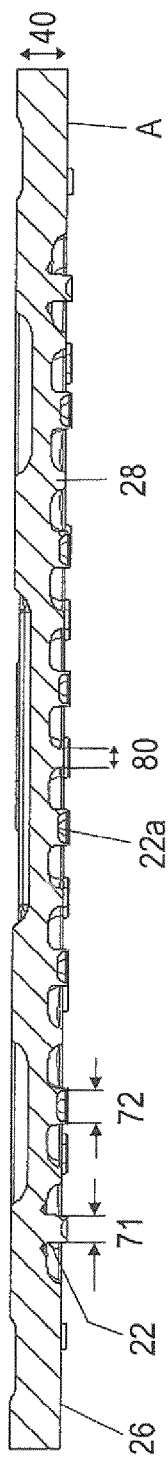
Figure 4:
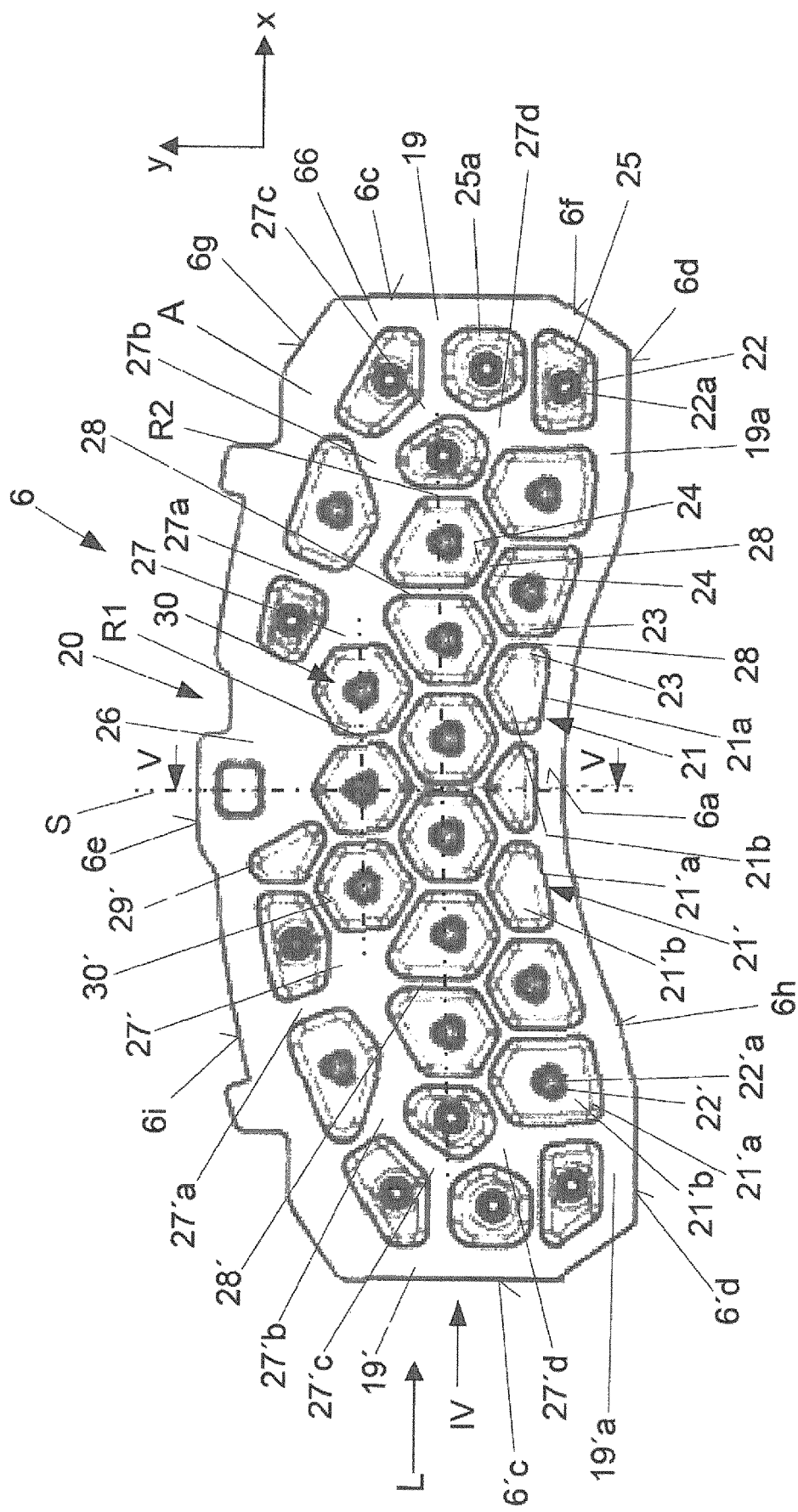
FIG. 4 shows a schematic view of a pad side of a first variant of the pad backplate according to FIG. 2.
Figure 5:
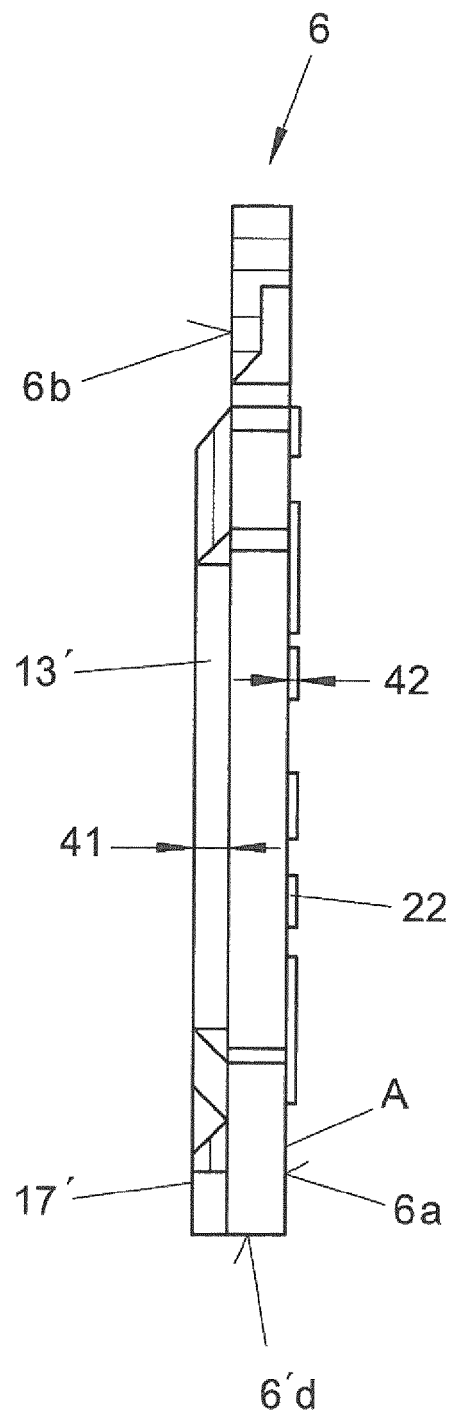
FIG. 5 shows a schematic side view of a contact surface of the pad backplate from direction IV according to FIG. 3.
Figure 6:
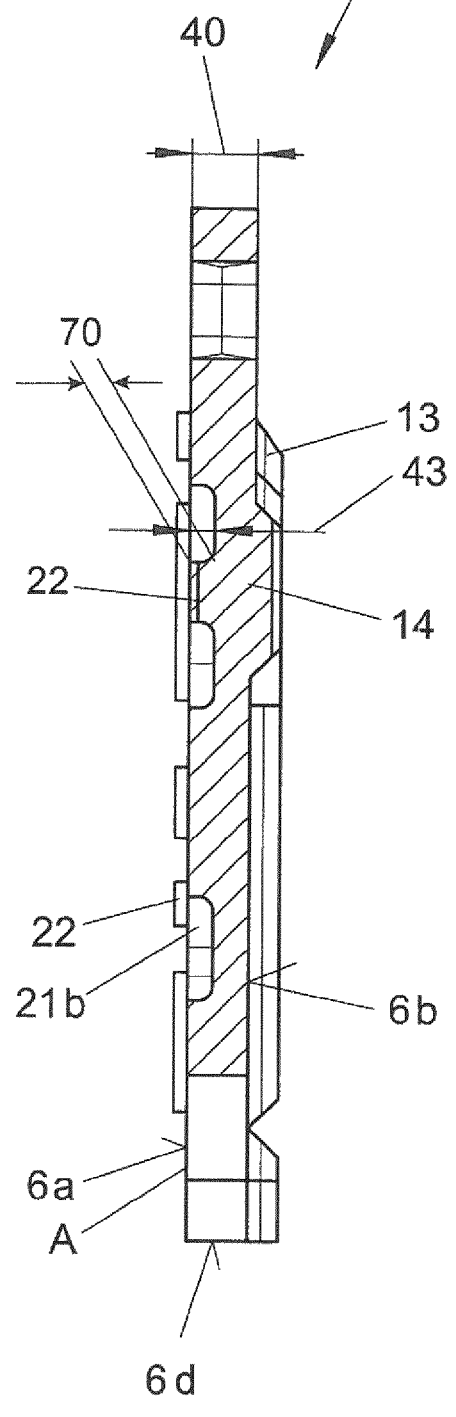
FIG. 6 shows a schematic sectional view along line V-V of the pad backplate from FIG. 3.

FIG. 2 illustrates a schematic view of an application side 6b of an exemplary embodiment of the pad backplate 6 of the application-side brake pad 12a. FIG. 3 shows the application side of FIG. 2 in the perspective view such that the elevations and depressions are even more clearly apparent. FIG. 4 shows a schematic view of the pad side 6a of the pad backplate 6 according to FIG. 2. FIG. 5 shows a schematic side view of a contact surface of the pad backplate 6 from direction IV according to FIG. 3. FIG. 6 shows a schematic sectional view along line V-V of the pad backplate 6 from FIG. 2.

The pad backplate 6 is designed as an integral, in particular monolithical, component, preferably a cast component made from steel, and so as to be reduced in weight. The upper side has partially rounded side surfaces 6i, bevels 6g (FIG. 4) and projections (not denoted specifically) for a pad retaining spring.

The pad backplate 6 extends in a longitudinal direction L which on a plane A, which is defined by a surface 26 of the pad side 6a of the pad backplate 6 and which, in the installed state in the disk brake 1 (FIG. 1), extends in a tangential direction with respect to the brake disk 2. In FIG. 4, the plane A runs in the plane of the drawing and is defined by the vectors x and y. An extension of the pad backplate 6 in the longitudinal direction L is preferably 1.75 times to 2.4 times as large as the extent of the axis S, which is arranged perpendicularly to the longitudinal direction L and on the plane A of the surface 26. A thickness 40 of the pad backplate 6 is shown in the sectional view along the axis S according to FIG. 6 and, in the installed state of the brake pad 12a, runs in the direction of the brake disk axis of rotation 2a. The thickness 40 of the pad backplate is bounded here by the surfaces 18 and 26.

The contact surfaces 6c and 6'c are formed on the two sides of the pad backplate 6, which extend parallel to the axis S, and, in one embodiment, can be machined mechanically. The contact surfaces 6c, 6'c are each in contact with an inner side of a brake carrier horn 3a, 3'a.

The lower side of the pad backplate 6 has a curved recess 6h (FIG. 4) which extends convexly from the lower side toward the center of the pad backplate 6 and is symmetrical with respect to the axis S. A straight portion of the lower side adjoins each end of the curved recess 6h on each side. Said portions are also symmetrical with respect to the axis S. Each of said portions in each case has the supporting surface 6d, 6'd already mentioned above toward the lower side. The supporting surfaces 6d, 6'd run in a common plane of the lower side at right angles to the contact surfaces 6c, 6'c and in the longitudinal direction of the pad backplate 6. A bevel is in each case arranged between the contact surfaces 6c, 6'c and the respective supporting surface 6d, 6'd.

In the region of the axis S, the upper side of the pad backplate 6 is provided with a further supporting surface 6e for supporting the abovementioned pad retaining clip. The supporting surface 6e may be re-machined.

Furthermore, the pad backplate 6 can have a clearance (not shown) for the insertion of a pad wear sensor. Said clearance may also be re-machined.

The frictional mass 5 is applied on the pad side 6a. The application side 6b is in contact with the application device 11. The application side 6b will first of all be dealt with further in conjunction with FIG. 2.

The regions of the application side 6b of the pad backplate 6, with which regions the application device 11 is in contact via the pressure pieces 7, 7', are arranged as pressure portions 13, 13', preferably of identical design, on the application side 6b symmetrically with respect to the axis S. In this exemplary embodiment, the pressure portions 13, 13' are of circular ring-shaped design. Each pressure portion 13, 13' protrudes from the application side 6b by a certain extent from a surface 18 of the application side 6b and thus forms a respective elevation with a height 41 (see FIG. 5). The surface 18 forms a main plane of extent of the pad backplate 6. In one embodiment, the height 41 can be, for example, at least 1 mm, preferably 2 mm, particularly preferably 3 mm.

In the installed state of the brake pad 12a in the disk brake 1 (FIG. 1), the center points or center lines, which are perpendicular to the drawing of FIG. 2, of the circular ring-shaped pressure portions 13, 13' run in the center lines of the associated brake plungers 8, 8'.

Each circular ring-shaped pressure portion 13, 13' is provided with a recess 13a, 13'a, e.g. with a circular cross section, as a result of which a certain annular width 13b, 13'b of each circular ring-shaped pressure portion 13, 13' is defined. In one embodiment, the annular width 13b, 13'b can be, for example, 1 to 2 cm. The recesses 13a, 13'a serve for reducing the weight of the pad backplate 6.

In this exemplary embodiment, the pressure portions 13, 13' are connected in their upper third to a web portion 14. The web portion 14 runs here between the pressure portions 13, 13' in a straight line in the longitudinal direction of the pad backplate 6 and has a web width 14a which is approximately half of the outer radius of a pressure portion 13, 13'. An imaginary center line M of the web portion 14 runs with respect to an imaginary connecting line V of the center points T1 and T2 of the pressure portions 13, 13' at a distance which corresponds here approximately to half the radius of a pressure portion 13, 13'.

Figure 7A:
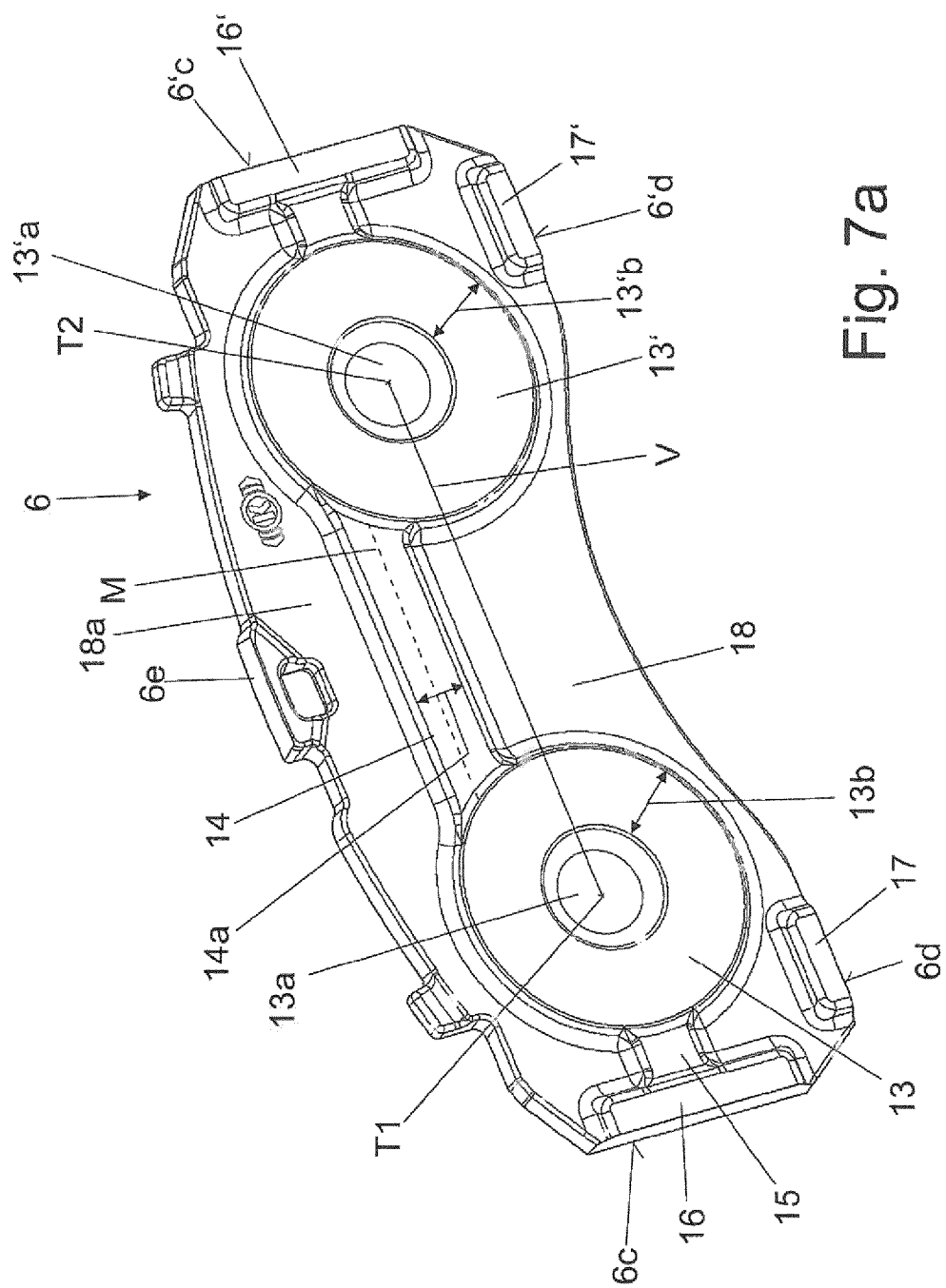
FIG. 7a shows a schematic perspective view of the pad backplate of FIG. 4.
Figure 7B:
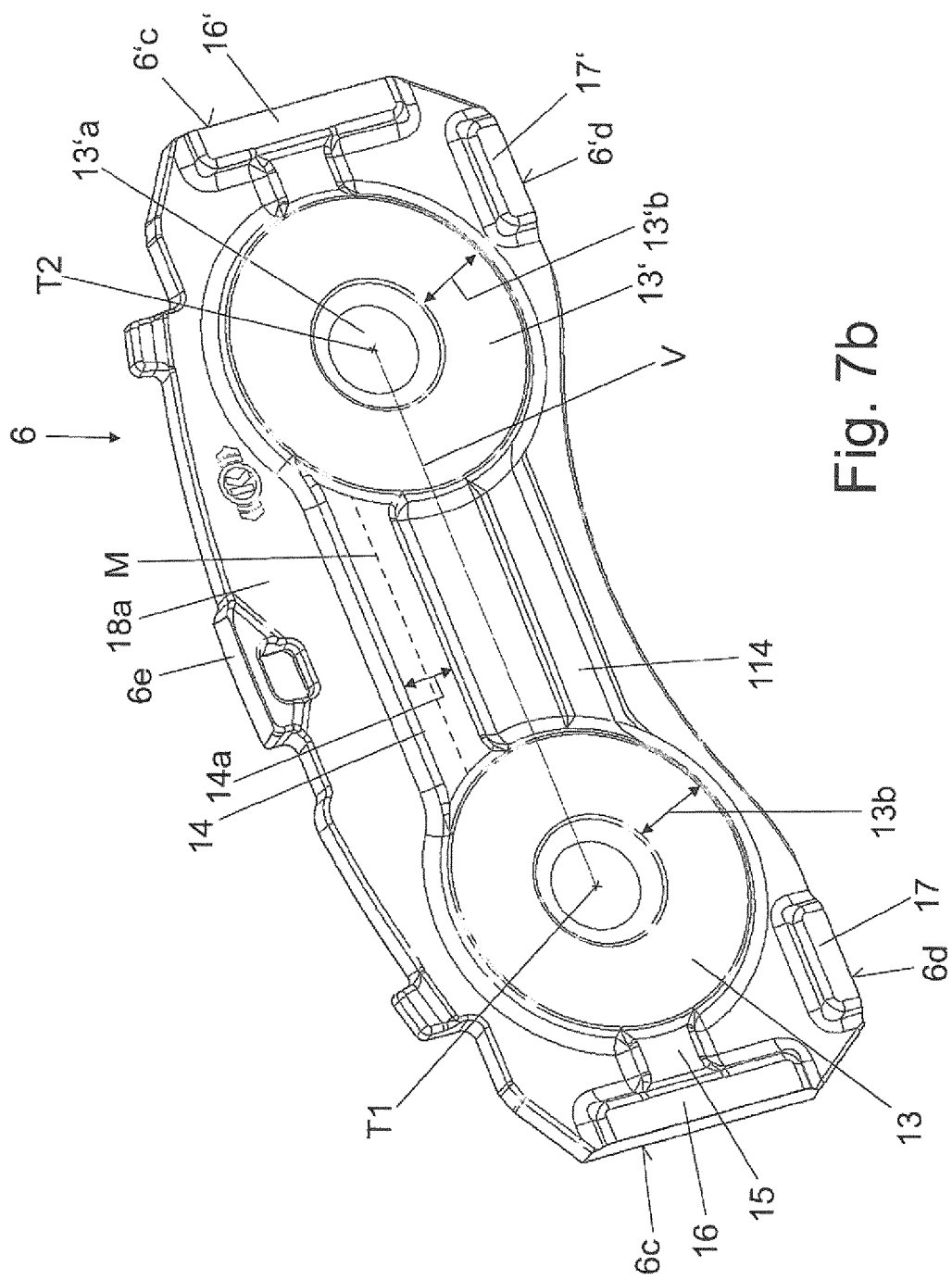

The web portion 14 forms a type of stiffening rib. Tests have shown that, in this embodiment, the pad backplate 6 can achieve a braking torque of the disk brake 1 of approx. 24 kNm. If a second web portion is additionally arranged in the lower region between the pressure portions 13, 13', the braking torque can be increased, for example, to 27 or 30 kNm. This is illustrated in FIG. 7b, which is otherwise identical to FIG. 7a. The second web portion (114) can likewise preferably have the abovementioned preferred web width and the preferred position in relation to the imaginary center line M.

The web width 14a of the web portion 14 here can be, for example, at least 1 cm.

The web portion 14 protrudes by a certain extent from a surface portion 18a, which lies in the same plane as the surface portion 18. This extent can be equal to the height 41 of the pressure portions 13, 13', or smaller or greater than said height. In one embodiment, the height 41 of the web portion 14 can be at least 1 mm.

In a further development, each pressure portion 13, 13' is connected on its respective side facing the associated side of the pad backplate 6 with the contact surface 6c, 6'c to a contact strip portion 16, 16' in each case via a short stiffening portion 15, 15'.

In the imaginary connecting line of the center points of the pressure portions 13, 13', the short stiffening portion 15, 15' extends radially from the circular ring-shaped pressure portion 13, 13' as far as the associated contact strip portion 16, 16', which runs at a right angle thereto. The stiffening portion 15, 15' here has a width which approximately corresponds to the web width 14a of the web portion 14.

Each contact strip portion 16, 16' forms a thickening and therefore stiffening of each side with the respective contact surface 6c, 6'c in the direction of the thickness 40 of the pad backplate 6. Each contact strip portion 16, 16' extends here over the entire length of the associated side parallel to the axis S in the direction thereof. An extent of each contact strip portion 16, 16' in the longitudinal direction of the pad backplate 6 can be approximately half a web portion width 14a here. The extent of this extent can be, for example, at least 8 mm, preferably 8.4 . . . 8.5 mm, particularly preferably 9 mm. A tolerance of said extent can lie, for example, within the range of ±0.4 mm.

The short stiffening portions 15, 15' and the contact strip portions 16, 16' connected thereto are symmetrical with respect to the axis S and protrude by a certain extent from the surface 18. This extent can correspond, for example, to the height 41 of the pressure portions 13, 13'.

In the region of the supporting surfaces 6d, 6'd, a respective supporting strip portion 17, 17' is provided on the associated portion of the surface 18, said supporting strip portion extending in the longitudinal direction of the pad backplate 6 from the respective outer end on the bevel toward the center over approximately three quarters of the length of the supporting surface 6d, 6'd.

An extent of each supporting strip portion 17, 17' in the direction of the axis S can be approximately half a web portion width 14a here. The extent of this extent can be, for example, at least 8 mm, preferably 8.4 . . . 8.5 mm, particularly preferably 9 mm. A tolerance of this extent can lie, for example, within the range of ±0.4 mm.

The supporting strip portions 17, 17' are arranged symmetrically with respect to the axis S and, similarly to or in the same manner as the contact strip portions 16, 16', protrude by an identical or different extent from the surface 18.

The contact strip portions 16, 16' together with their outer sides in each case form an enlargement of the lateral contact surfaces 6c, 6'c. The supporting strip portions 17, 17' together with their lower sides in each case form an enlargement of the supporting surfaces 6d, 6'd. The stiffening portions 15, 15', the contact strip portions 16, 16' and the supporting strip portions 17, 17' also form a stiffening of the pad backplate 6.

The dimensioning and shaping of the web portion 14, of the connecting regions between the latter and the pressure portions 13, 13', of the stiffening portions 15, 15', of the contact strip portions 16, 16' and of the supporting strip portions 17, 17' are formed in a load- and/or noise-optimized manner corresponding to the forces which occur. Use is made for this purpose of measurement results from which force progressions and/or excitation frequencies can be determined.

The pressure portions 13, 13', the web portion 14, the stiffening portions 15, 15', the contact strip portions 16, 16' and the supporting strip portions 17, 17' are each provided with a bevel or a rounded transition to the surface 18, 18a of the pad backplate 6. Said rounded transitions can have a radius, for example, within a range of 3 . . . 8 mm. The contact strip portions 16, 16' and the supporting strip portions 17, 17' are each correspondingly machined on their outer sides in order to enlarge the respectively associated contact surfaces 6c, 6'c or supporting surfaces 6d, 6'd.

By means of this construction of the application side 6b of the pad backplate 6 of the application-side brake pad 12a, a reduction in weight of the overall weight of the application-side brake pad 12a can be achieved. The material of the pad backplate 6b, which would otherwise be located between the above-described elevation portions 13, 13'; 14; 15, 15'; 16, 16'; 17, 17', has been abraded except for the surface 18, 18a. The structure of the elevation portions 13, 13'; 14; 15, 15'; 16, 16'; 17, 17', the arrangement thereof, in particular in regions of force progressions with high proportions of force, and connection to one another permits a sufficient rigidity and strength for use of the application-side brake pad 12a in different brake embodiments despite the saving on material.

A further possibility for reducing weight while simultaneously maintaining the strength and stability of the application-side brake pad 12a consists in configuring the pad side 6a of the pad backplate 6. This will now be described in more detail in conjunction with FIG. 4.

The pad side 6a has a surface 26, into which a structural arrangement 20 is molded.

The surface 26 forms a preferably flat edge region 66 running around the structural arrangement. The pad backplate 6 has a uniform plate thickness with the thickness 40 over the greatest part of the encircling edge region 66, in particular outside the contact portions 16, 16', 17, 17'. However, there are also smaller edge portions which have a material thickness of up to 8.5 cm.

The structural arrangement 20 has a number of different structural elements 21, 21', 29', 30, 30'. Portions which have differing width and are branched are arranged between the structural elements 21, 21', 29', 30, 30' and form stiffening portions 27, 27', web stiffening portions 27a-27d, 27'a-27'd and webs 28, 28'.

The structural element 21 has an edge 21a and a recess 21b with a depth 43 (FIG. 6). The recess 21b has a base surface 21c which preferably runs parallel to the surface 26. The edge 21a surrounds the recess 21b in an encircling manner and is provided with a bevel and/or rounding 65. This construction is representative of all of the structural elements 21, 21', 29', 30, 30'.

In this exemplary embodiment, most of the structural elements 21, 21', 29', 30, 30' have dome-like elevations 22, 22'. The elevations 22, 22' can be round, oval, triangular or polygonal, with a filled core and/or hollow because of depressions 22a, 22'a on the inside. The depressions 22a, 22'a are open facing toward the frictional mass 5 (FIG. 1). In this exemplary embodiment, the elevations 22, 22' protrude from the base surface 21c of the respective recess 21b, for example as far as the height of the respective edge 21a. In one variant, the elevations 22, 22' can also protrude from the surface 26 by a certain extent beyond the respective edge 21a. This extent can be, for example, within a range of preferably 1 to 2 mm.

In a top view perpendicular to the plane of the surface 26, the elevations 22, 22' in FIG. 4 can take up between 15 to 50%, in particular 20-30%, of the surface of the recess 21b. The surface of the recess here is the surface which the recess takes up on the plane of the surface 26. Surfaces, for example the edge surface, which run perpendicularly to the surface 26 are not taken into consideration here and, in the case of surfaces which run obliquely or in the manner of a curve with respect to the plane of the surface 26, for example in the case of roundings 65, only the vectorial portion, which runs parallel to the plane of the surface 26, is taken into consideration.

The recess 21*b* has the depth 43 by which said recess is lowered in relation to the plane of the surface 26. This maximum depth can preferably be between 20 to 60% of the plate thickness 40.

As is seen, the elevations 22, 22' also have a differing width 71 and 72.

A minimum distance 95 is defined by the narrowest point or the shortest distance between the elevation 22 and the edge 21*a* of the recess 21*b*. It can preferably be at least 50%, particularly preferably 80-400%, of the depth of the recess.

The elevations 22, 22' have a height 70 by which they protrude from the base surface 21*c*. The height 70 can preferably be between 120% to 165% of the maximum depth 43.

The webs 28, 28' preferably have a width 80 along a portion of at least 50% of their respective main direction of extent. Said width 80 is preferably between 80-130% of the depth 43 of the recess 21*b*.

The end sides the webs 28, 28' preferably lie together with the surface 26 on a plane A.

The length 90 of at least 50% of all of the webs 28, 28', in particular of at least 50% of all of the webs 28, 28' having a uniform width, along their respective direction of main extent can preferably be between 2.5-7 times the depth 43 of the recess 21*b*.

At least 50% of all of the webs preferably have a uniform length 90. "Uniform" means here that the length of the corresponding webs differs from one another by less than 10%. The same applies to the width.

The width 80 of at least 50% of all of the webs of the structural arrangement, in particular of at least 50% of all of the webs with a uniform length 90, can preferably be at least 1.8 mm, preferably 2-4 mm.

The length 90 of at least 50% of all of the webs of the structural arrangement, in particular of at least 50% of all of the webs of the structural arrangement with a uniform width 80, can preferably be at least 3 mm, preferably 4-6 mm.

All of the structural elements 21, 21', 30, 30' are of polygonal design, wherein all of the corners are rounded.

The shape of the structural elements and the configurations thereof along the surface 26 and also the shape of the elevations within the recess 21*b* can be once again seen more clearly in perspective in FIG. 7.

The structural arrangement 20 of the structural elements 21, 21', 29', 30, 30' has two central rows R1, R2 which run in the longitudinal direction of the pad backplate 6. The upper central row R1 here has three hexagonal honeycomb structural elements 30, 30' next to one another. Two further honeycomb structural elements 30 are arranged in the row R2 lying therebelow, thus resulting in a type of honeycomb structure which is symmetrical with respect to the axis S. The axis S runs here through the central honeycomb structural element 30 of the upper row R1 and, below the latter, through a web portion which separates the two honeycomb structural elements 30 of the lower row R2.

A pentagonal structural element is arranged on the right of the one of the two honeycomb structural elements 30 of the lower row R2, the left half of which structural element forms a half honeycomb structural element, wherein the upper corner point of the right half lies further at the top. Further to the right next to said pentagonal structural element, there is arranged a pentagonal structural element which is mirror-inverted with respect thereto and on the right side of which is an irregular square structural element. This arrangement is located symmetrically with respect to the axis S on the left side of the left honeycomb structural element 30 in the lower row R2.

All of the structural elements of the upper and lower row R1, R2 have elevations 22, 22' with depressions 22*a*, 22'*a*, wherein imaginary lines of the two rows R1, R2 each run through the center points of the elevations 22, 22'. The elevations 22, 22' of the outer irregular square structural elements are circular, with the other elevations 22, 22' having a triangular design. The elevations 22, 22' serve not only for stiffening purposes, but also for improving a fastening of the frictional mass 5 on the pad side 6*a*.

This arrangement of the central rows R1, R2 is surrounded in an encircling manner with the structural elements 21, 21' in an arrangement symmetrical with respect to the axis S. Only one structural element 29' in the upper left region is present as an individual element. Except for three "half" honeycomb structural elements in the center below the lower row R2 and except for the structural element 29', all of the other structural elements 21, 21' of the surrounding arrangement are each provided with an elevation 22, 22'.

In the lateral edge regions, three structural elements 21, 21' of the encircling arrangement are in each case arranged one above another, wherein the uppermost structural element 21, 21' in each case is arranged with two further structural elements 21, 21' on an arc which runs in each case from the edge toward the axis S.

In addition to the respective lower edge region structural element 21, 21', on in each case three structural elements 21, 21' are located on an arc, which is concentric with respect to the curved side surface 6*h*, on the left and right of a central triangular structural element 21.

The structural elements 21, 21' of the surrounding arrangement each have an edge portion of their respective edge 21*a*, 21'*a*, which edge portion runs substantially in the same manner as that portion of the edge of the pad backplate 6 which in each case lies next thereto. For example, the outer edge portions 25 of the in lower structural elements 21, 21', which are arranged one above another, in the edge regions each run parallel to the bevels with the side surfaces 6*f*. The central structural elements 21, 21' of the structural elements 21, 21', which are arranged one above another, in the edge regions have edge portions 25*a* which run parallel to the edges with the lateral contact surfaces 6*c*, 6'*c*.

Relatively extensive stiffening portions 27, 27' are formed between the left and the right end honeycomb structural element 30, 30' of the upper row R1 and the structural elements 21, 21' of the surrounding arrangement, said stiffening portions being connected to further web stiffening portions 27*a*, 27'*a* and 27*b*, 27'*b* and lying in regions of the pressure portions 13, 13' of the application side 6*b* of the pad backplate 6, in particular in the region of the outer diameters of the pressure portions 13, 13', on which the brake plungers 8, 8' of the application device 11 act during braking operations and correspondingly high forces can occur. This forms a stiffening which is capable of distributing the occurring forces effectively in the pad backplate 6 in such a manner that a reduction of overloading and risk of fracture and also an increase in a service life can be achieved.

For this purpose, further relatively wide web stiffening portions 27*c*, 27'*c* and 27*d*, 27'*d* are also provided between the end structural elements 21, 21' of the lower row R2 and the lateral edge structural elements 21, 21', which are arranged one above other, of the surrounding arrangement.

One web or a plurality of webs 28, 28' for stiffening purposes is or are also provided between edge portions 24 of the structural elements 21, 21', 30, 30' of the two rows R1, R2 one below the other, and between the latter and the structural elements 21, 21' of the lower curved portion of the surrounding arrangement and, in turn, of the edge portions 23 thereof one below the other.

FIGS. 8a-8e illustrate a schematic view of the pad side 6a of a second variant of the pad backplate 6.

In the variant according to FIGS. 4 and 7, the structural arrangement 20 on the pad side 6a of the pad backplate 6 is arranged symmetrically with respect to the axis S. The structural arrangement 20 here has structural elements 29, 29', 29a, 29'a, 31, 31', 31a, 31'a, 32, 32', 32a, 32'a, 33, 33', 34, 34', 35, 35', 36, 36', 37 and 37' of differing shape and size. As described above, said structural elements can be formed with depressions having encircling edges and with or without inner elevations. The elevations can be shaped here, for example, trapezoidally, or in other ways.

For better clarity, some simplifications have been undertaken within the scope of the designations in FIGS. 8b-8e:

For simplification purposes, the edges of the recesses of the structural elements 29, 29', 29a, 29'a, 31, 31', 31a, 31'a, 32, 32', 32a, 32'a, 33, 33', 34, 34', 35, 35', 36, 36', 37 and 37' are denoted uniformly by 21"a.

For simplification purposes, the recesses of the structural elements 29, 29', 29a, 29'a, 31, 31', 31a, 31'a, 32, 32', 32a, 32'a, 33, 33', 34, 34', 35, 35', 36, 36', 37 and 37' are denoted uniformly by 21"b.

For simplification purposes, the elevations in the recesses 21"b of the structural elements 29, 29', 29a, 29'a, 31, 31', 31a, 31'a, 32, 32', 32a, 32'a, 33, 33', 34, 34', 35, 35', 36, 36', 37 and 37' are denoted uniformly by 22".

The base surface of the recesses 21"b are denoted by 21"c.

For simplification purposes, the depressions in the elevations 22" are denoted uniformly by 22"a.

Each elevation 22" has a minimum distance from the one edge 21"a bounding the recess.

Said minimum distance can preferably be at least 50%, particularly preferably 80-400%, of the depth of the recess.

It goes without saying that the geometry and dimension of the depressions 21", the base surfaces 21"c and the elevations 22" and/or the depressions 22"a located therein can differ from one another in geometry and dimensioning.

In this variant, seven structural elements 31, 31a, 32, 32a, 33, 34 and 34a are arranged in a circular manner around a circular structural element 35 on the right half of the pad side 6a. A center point of the inner structural element 35 lies on the axis through the center point of the pressure portion 13 located on the application side 6b and therefore on the axis of the associated brake plunger 8. The arrangement located on the circular line lies in the region of the circular ring of the pressure portion 13.

The circular structural element 35 which is arranged centrally in this manner is surrounded by a hub-like annular web portion 28a. The annular web portion 28a is connected in the manner of spokes to seven spoke web portions 28b which extend radially from the annular web portion 28a and are arranged at essentially identical angular distances from one another. The spoke web portions 28b run here in each case between the circularly arranged structural elements 31, 31a, 32, 32a, 33, 34 and 34a and are connected at their outer imaginary end to a further annular web portion 28c. A width of the spoke web portions 28b increases with the distance outward from the inner annular web portion 28a.

The further annular web portion 28c surrounds the circularly arranged structural elements 31, 31a, 32, 32a, 33, 34 and 34a. This forms a type of spoke wheel arrangement, wherein the structural elements 31, 31a, 32, 32a, 33, 34 and 34a lie in the intermediate spaces of the spoke web portions 28b and annular web portions 28a, 28c.

The shape of each of the circularly arranged structural elements 31, 31a, 32, 32a, 33, 34 and 34a is substantially similar to a trapezoid, wherein the edge portions on the annular web portions 28a and 28c each corresponding in a curved manner to the diameter of the respective annular web portion 28a, 28c.

The circular arrangement of the structural elements 31, 31a, 32, 32a, 33, 34 and 34a is described with respect to an upper reference spoke web portion 28b1, the imaginary longitudinal axis of which runs obliquely downwards with an extension through the center point of the central circular structural element 35 and thus encloses an angle of approximately 30° with the axis S.

On the left and right of said reference spoke web portion 28b1, the structural elements 31, 31a are arranged symmetrically with respect thereto and are designed in the manner of trapezoids. The imaginary longitudinal axis of the reference spoke web portion 28b1 runs diametrically opposite with an extension through the structural element 33, which is likewise of trapezoidal design and the lower edge portion of which faces the curved recess 6h.

The two structural elements 32, 32a which are likewise symmetrical with respect to a spoke web portion 28b are symmetrical with respect to the opposite two structural elements 34, 34a in addition to being symmetrical with respect to the imaginary longitudinal axis of the reference spoke web portion 28b1.

The structural element 36 is provided in the lateral region of the contact surface 6c. A straight edge portion of the structural element 36 runs in the direction of the axis S parallel to the contact surface 6c. The opposite edge portion is concentric with respect to the outer radius of the structural element 32, which lies next thereto on the circular path, and is separated therefrom by the annular web portion 28c lying inbetween.

In this variant, the pad backplate 6 does not have any bevels, but rather has notches (not denoted specifically) at the lower corners between the contact surfaces 6c, 6'c and the supporting surfaces 6d, 6'd.

A triangular structural element 37, the lower edge portion of which runs parallel to the supporting surface 6d, is arranged here above the supporting surface 6d. An edge portion facing the structural element 32a, like the corresponding edge portion of the structural element 36, is concentric with the outer radius of the structural element 32a, which lies next thereto on the circular path, and is separated from the latter by the annular web portion 28c lying inbetween.

A relatively extensive structural element 29, 29a is in each case arranged between the structural elements 34 and 34a and the axis S and is separated from the respective structural element 34, 34a by the annular web portion 28c. Those edge portions of the structural elements 29, 29a which face the structural elements 34, 34a are shaped in a manner corresponding to the annular web portion 28c concentrically with respect thereto.

A spoke web portion 28b which widens further as far as the axis S runs between the structural elements 29, 29a and is connected to a central web 28 running on the axis S. The outer edge portions of the structural elements 29, 29a correspondingly run to those edge contours of the pad backplate 6 that are located in their vicinity.

A left upper corner, facing the axis S, of the structural element 19 is recessed because of an opening in the pad backplate 6.

The structural elements 29', 29'a, 31', 31'a, 32', 32'a, 33', 34', 34'a, 35', 36' and 37' on the left half of the pad side 6a are arranged and constructed in a mirror-inverted manner with respect to the axis S to the structural elements 29, 29*a*, 31, 31*a*, 32, 32*a*, 33, 34, 34*a*, 35, 36 and 37 of the right half. The above description therefore also applies to the left half.

Figure 8A:
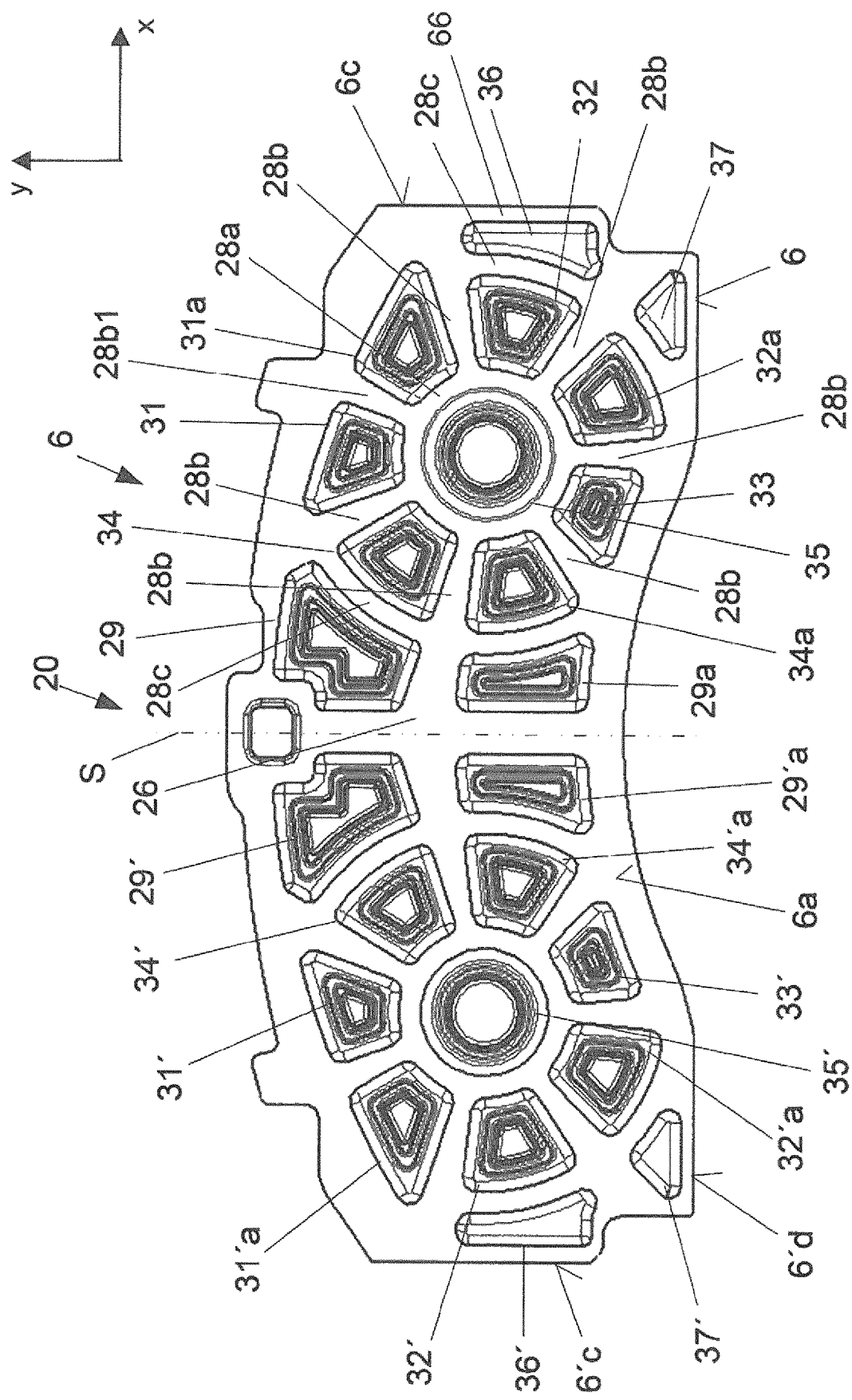
Figure 8B:
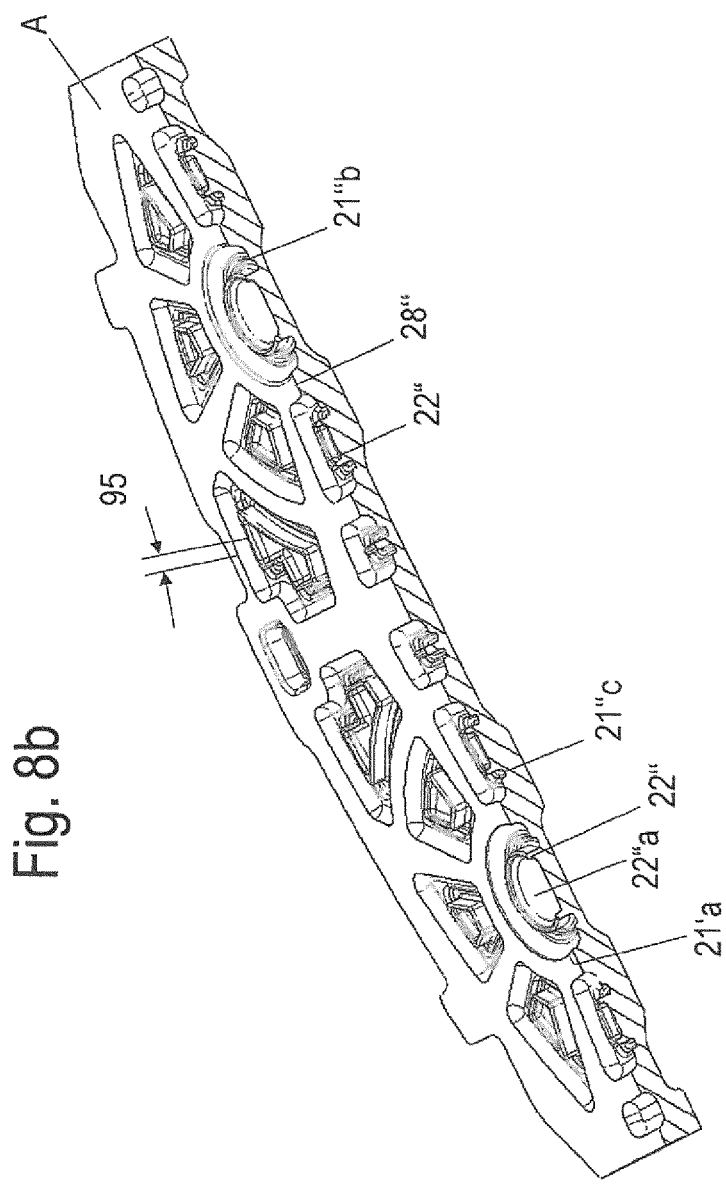
Figure 8D:
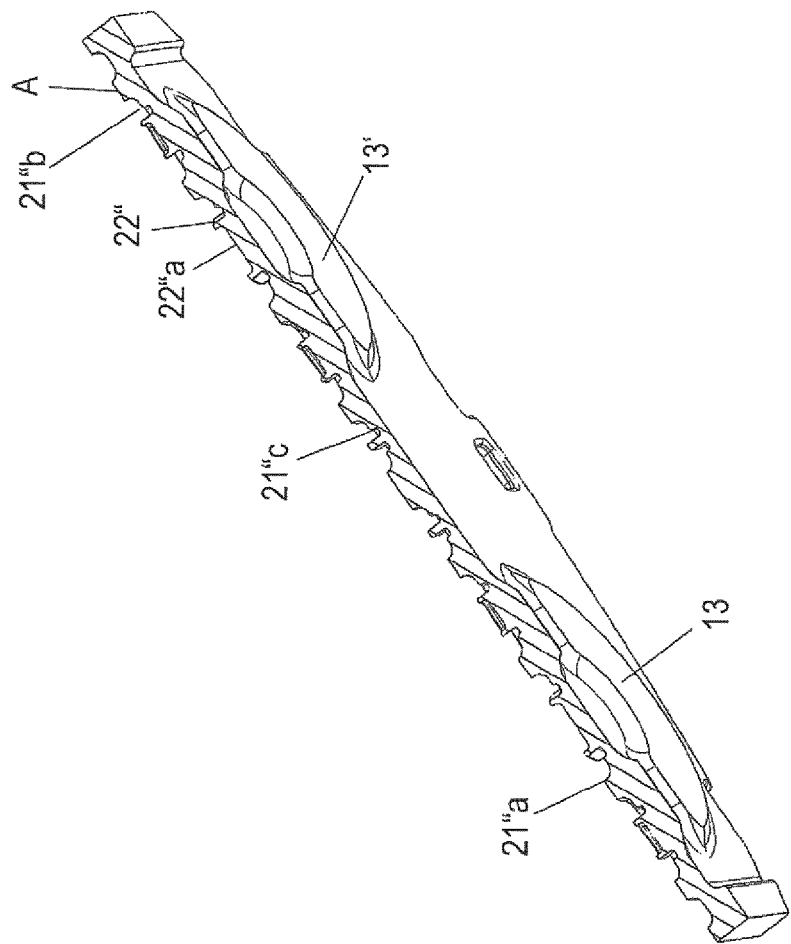
Figure 8E:
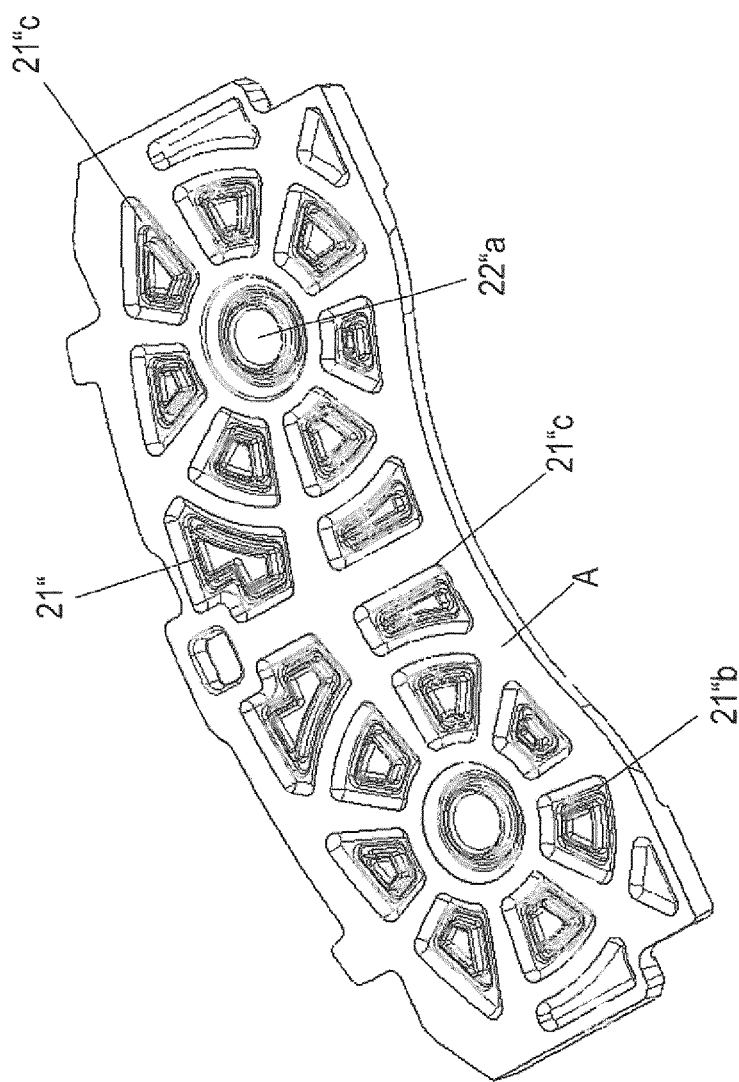

FIGS. 7-11, except for FIG. 8*a*, illustrate schematic views of the application side 6*b* of further variants in the construction of the application side 6*b* of the pad backplate 6 according to FIG. 2. The above descriptions of the embodiment according to FIG. 2 also apply here and are not mentioned again, unless necessary. Only the differences will be described.

Figure 9:
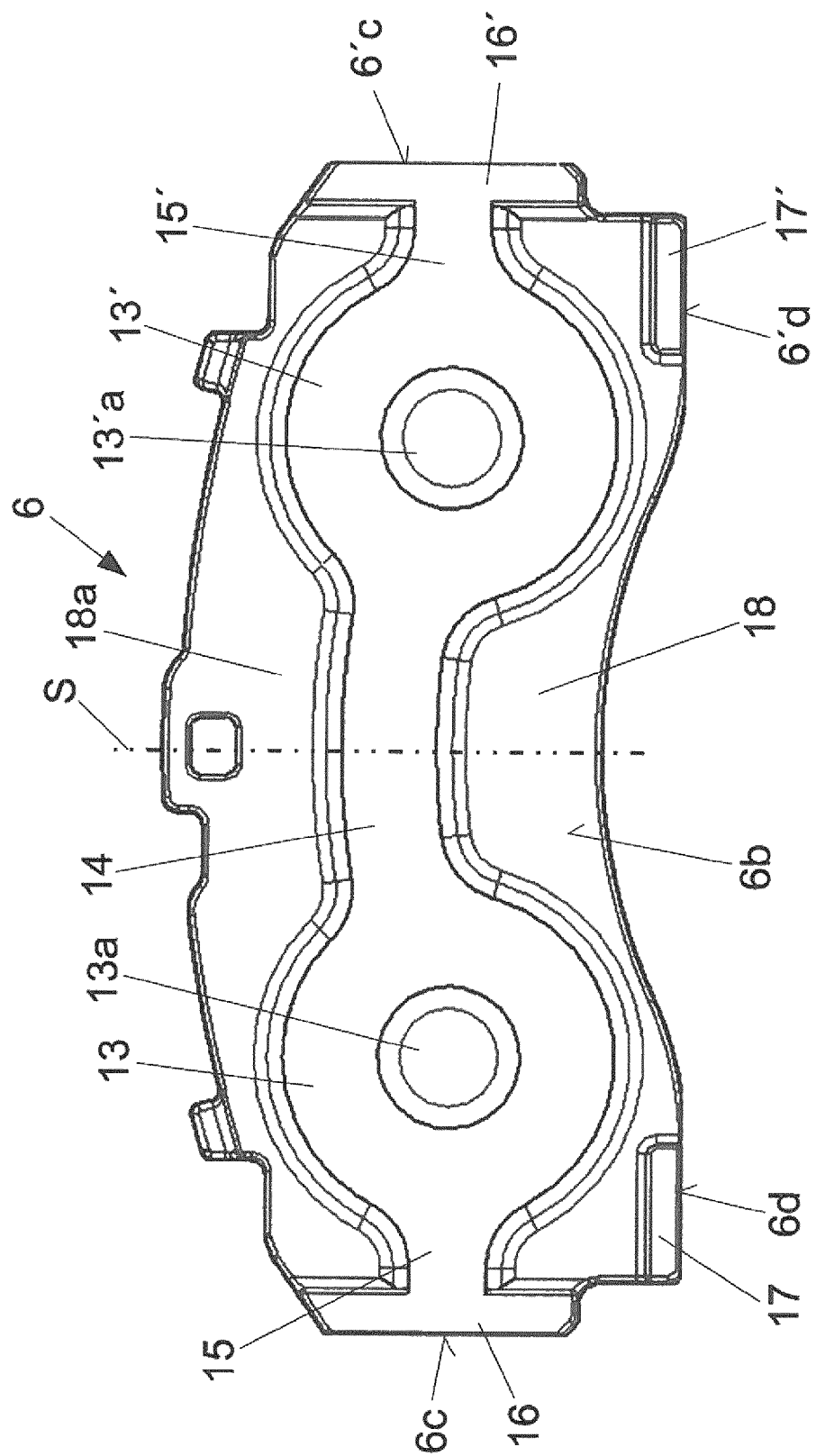
FIGS. 9-13 show schematic views of the application side of further variants of the pad backplate according to FIG. 2.

FIG. 9 shows a first variant, in which the web portion 14 between the pressure portions 13, 13' has a slightly curved shape. The transitions of the web portion 14 to the respective pressure portion 13, 13' are provided with larger radii than in the first exemplary embodiment according to FIG. 2. This is also the case in the transitions between the pressure portions 13, 13' and the stiffening portions 15, 15'.

Figure 10:
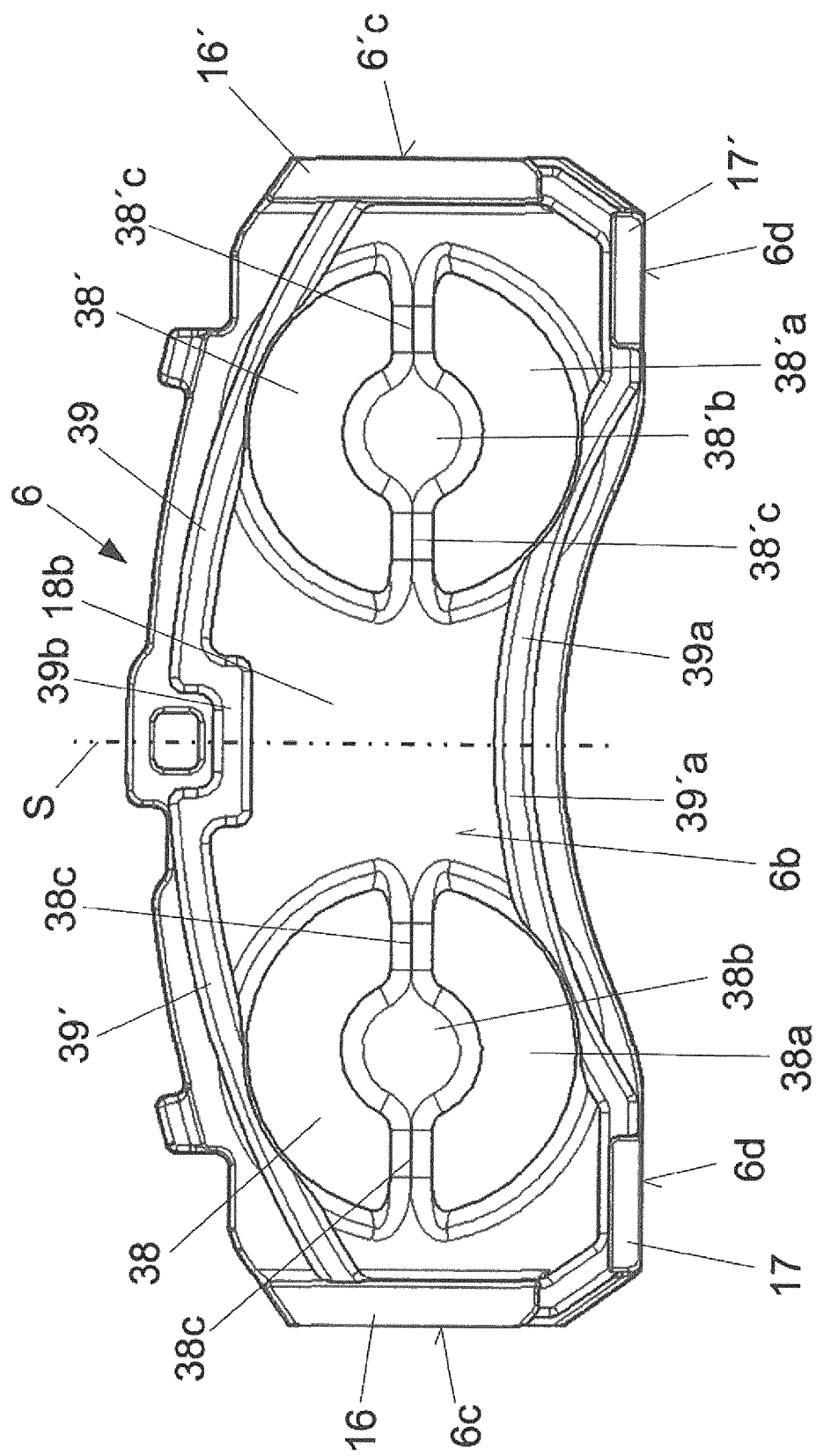

A second variant in the construction of the application side 6*b* is illustrated in FIG. 10. The circular ring-shaped pressure portions 13, 13' of the first exemplary embodiment according to FIG. 2 are each divided here into two semicircular annular segment pressure portions 38, 38*a* and 38', 38'*a*. A respective circular depression 38*b*, 38'*b* is formed in the center thereof and communicates on both sides with a respective rectilinear depression 38*c*, 38'*c* between the associated annular segment pressure portions 38, 38*a* and 38', 38'*a*. The rectilinear depressions 38*c*, 38'*c* run on an imaginary straight connecting line in the longitudinal direction of the pad backplate 6 through the center points of the annular segment pressure portions 38, 38*a* and 38', 38'*a*.

The upper annular segment pressure portions 38, 38' are each connected on their outer side by a curved web portion 39, 39'. The web portion 39, 39' is designed in a bent manner in the center in the region of the axis S about a lower region of an opening (not denoted specifically) in the pad backplate 6 with a web portion 39*b* and runs in the vicinity of the upper edge arc of the pad backplate 6, but with a smaller arc radius.

The left and right end of the web portion 39, 39' is in each case connected in an upper quarter of the respective contact strip portion 16, 16'.

A further, lower web portion 39*a*, 39'*a* connects the lower annular segment pressure portions 38*a*, 38'*a* on their lower outer sides and runs concentrically with respect to the convex recess 6*h* on the lower edge of the pad backplate 6 at a distance which is approximately the same size as the width of the web portion 39*a*, 39'*a*.

The connecting points of the lower web portion 39*a*, 39'*a* to the lower annular segment pressure portions 38*a*, 38'*a* each lie diametrically with respect to the connecting points of the upper web portion 39, 39' to the upper annular segment pressure portions 38, 38'. A respective imaginary line through said connections in each case forms an angle of approximately 20° with the axis S.

The left and right end of the lower web portion 39*a*, 39'*a* is in each case connected in the region of the supporting surfaces 6*d*, 6'*d* to the respective supporting strip portion 17, 17' and in each case runs in the region of the bevels further than a connection between the respective supporting strip portion 17, 17' and the respective lower end of the associated contact strip portion 16, 16'.

A width of the web portions 39, 39', 39*a*, 39'*a* corresponds here approximately to one third of the width of the annular segment pressure portions 38, 38', 38*a*, 38'*a*.

Stiffening portions 15, 15' are not present in this variant.

Figure 11:
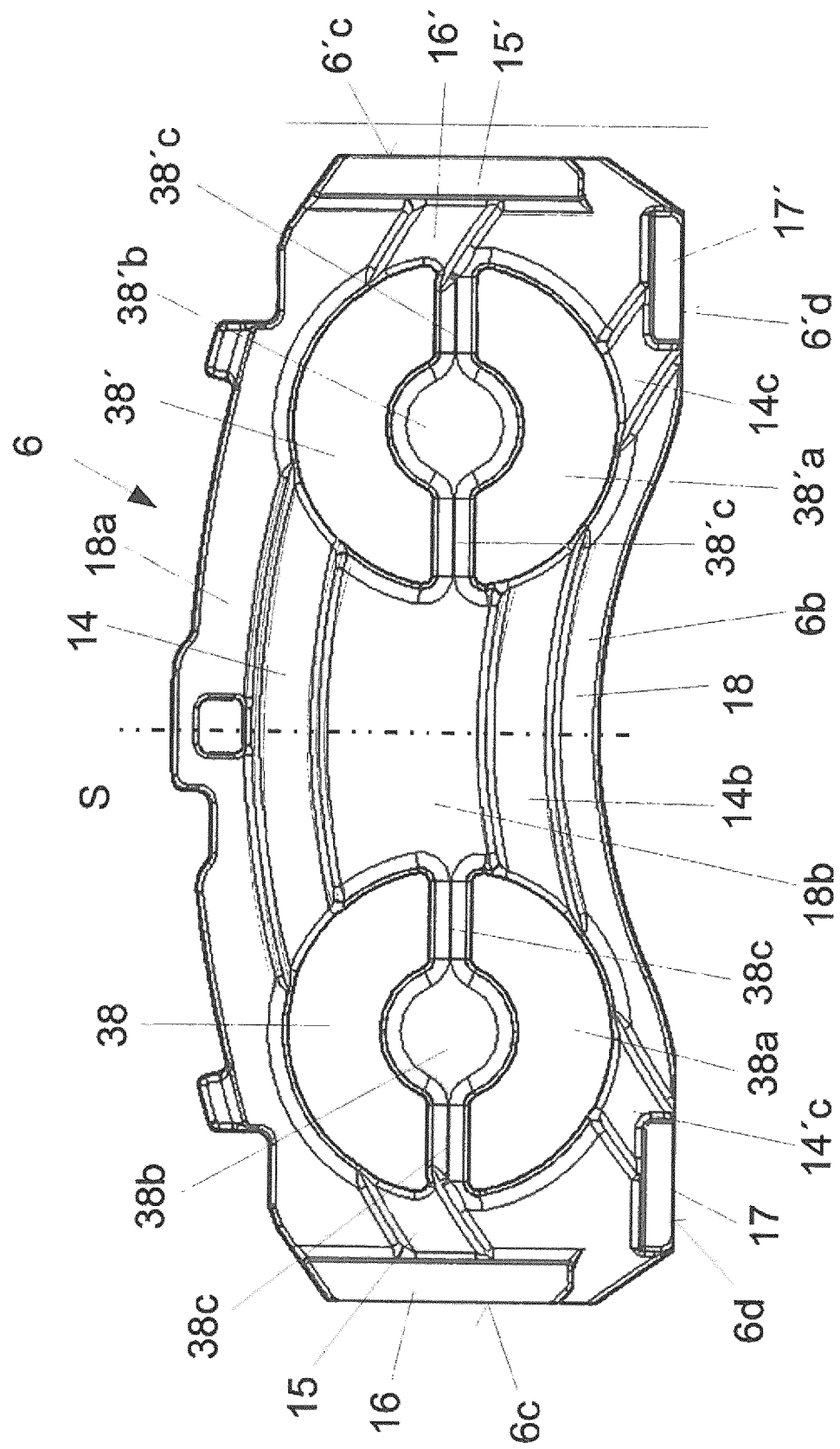

Like the variant according to FIG. 9, the third variant according to FIG. 11 has upper and lower annular segment pressure portions 38, 38', 38*a*, 38'*a* which are connected to one another by two web portions 14, 14*b*. In contrast thereto, however, the two web portions are wider, for example almost as wide as the width of the annular segment pressure portions 38, 38', 38*a*, 38'*a*.

The upper web portion 14 runs here between the two upper annular segment pressure portions 38, 38' substantially concentrically with respect to the edge arc of the pad backplate 6 below the opening (not denoted specifically) of the pad backplate 6.

Each end of the upper web portion 38, 38' penetrates the respective upper annular segment pressure portion 38, 38' and leaves the latter on the outer side in order, in each case as a stiffening portion 15, 15', to connect the respective upper annular segment pressure portion 38, 38' to the associated contact strip portion 16, 16' in the center thereof.

The lower web portion 14*b* is likewise curved and concentric with respect to the convex recess on the lower side of the pad backplate 6. The lower web portion 14*b* runs between the lower annular segment pressure portions 38*a*, 38'*a*, connects the latter, penetrates them and, over the further course of its arc, protrudes again with its respective end as a respective web portion 14*c*, 14'*c*, which connects the respective lower annular segment portion 38*a*, 38'*a* to the associated contact strip portion 17, 17'.

Figure 12:
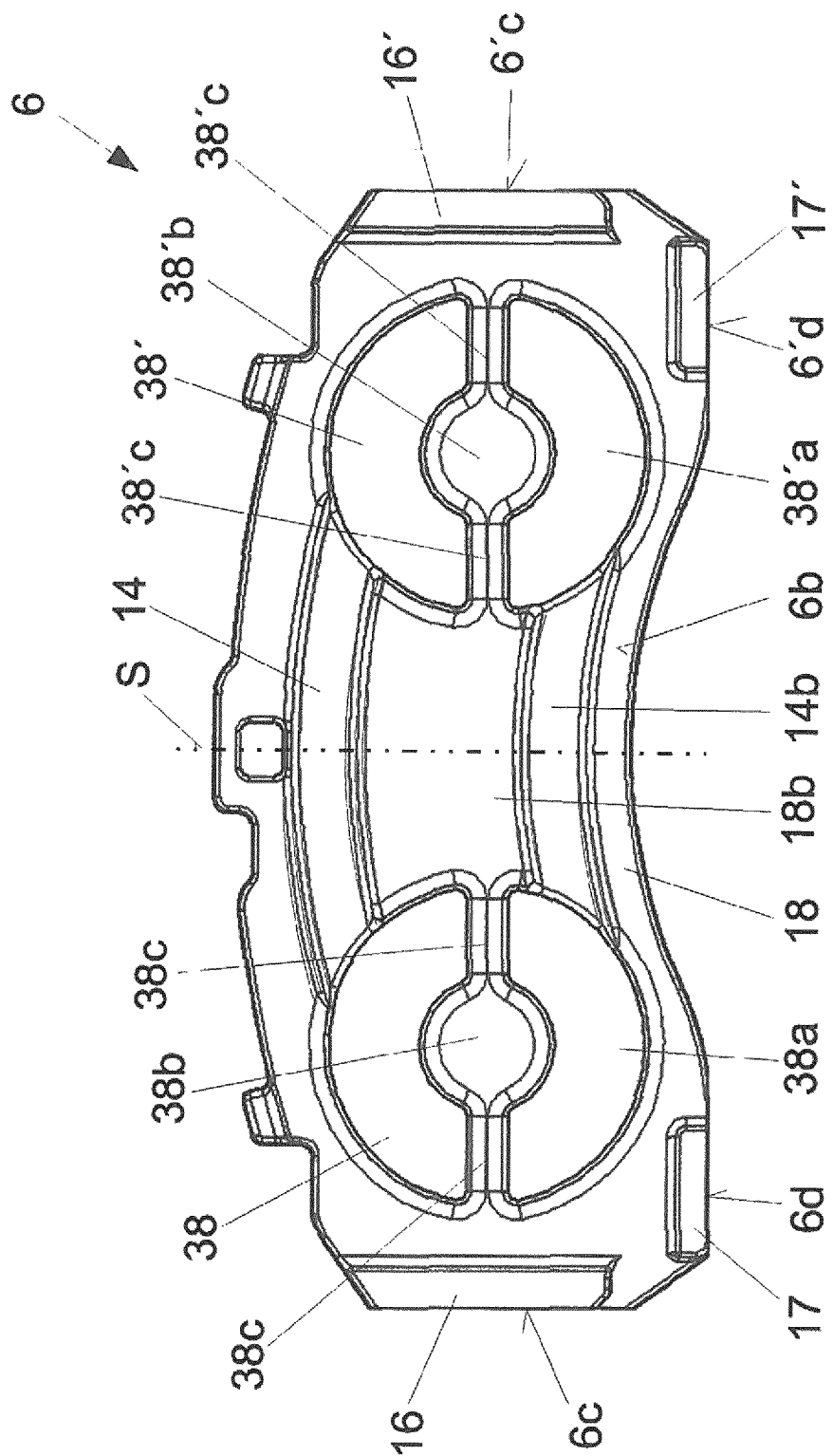

FIG. 12 shows a fourth variant which corresponds to the third variant according to FIG. 9 except for the absent stiffening portions 15, 15' and web portions 14*c*, 14'*c*.

Figure 13:
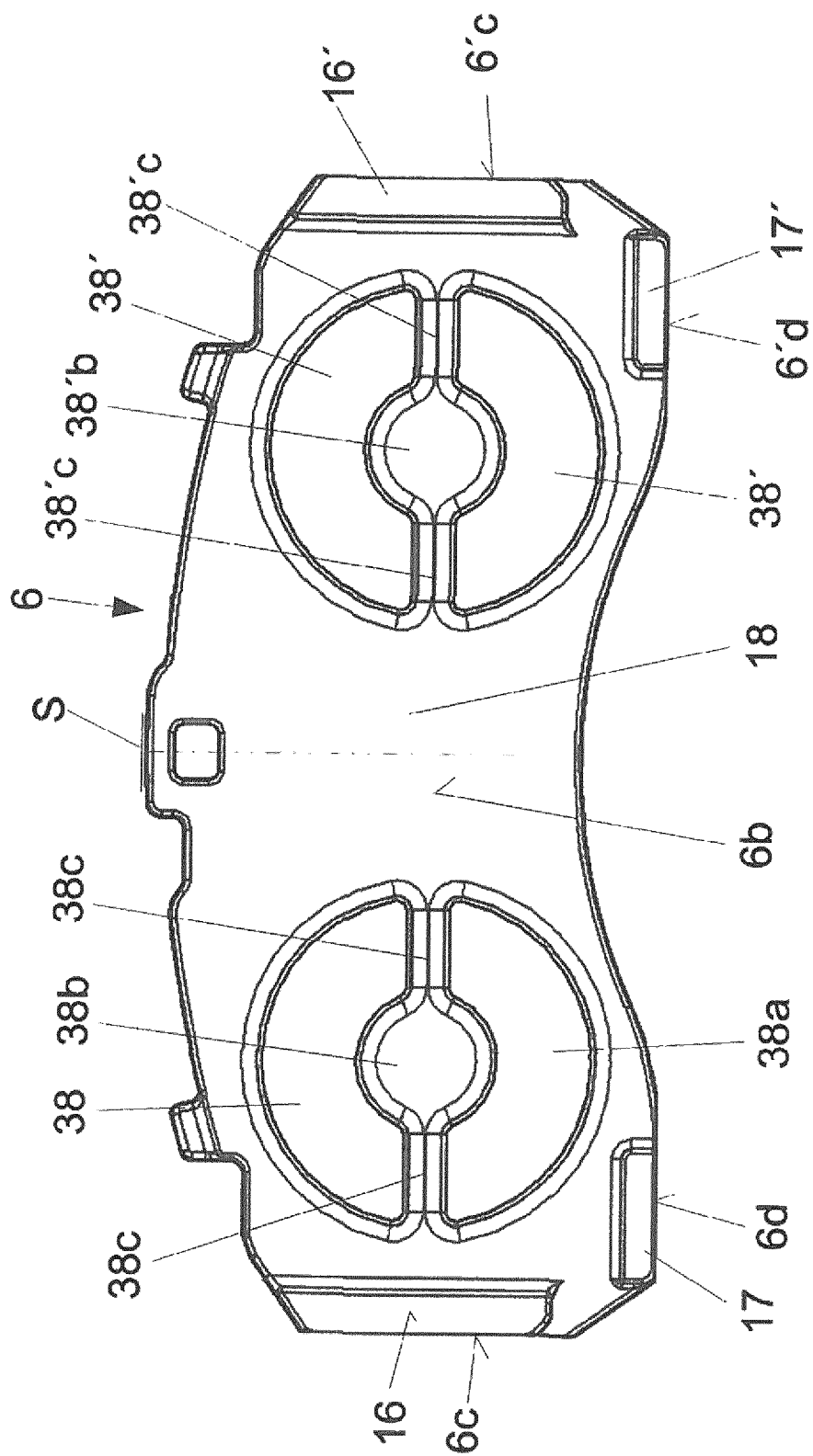

FIG. 13 illustrates a fifth variant which corresponds to the fourth variant according to FIG. 10 except for the missing web portions 14, 14*b*.

The dimensioning and shaping of the web portions 14, 14' . . . , 39, 39', 39*a*, 39'*a* of the connecting regions between the latter and the pressure portions 13, 13' or annular segment pressure portions 31-37, the stiffening portions 15, 15', the contact strip portions 16, 16' and the supporting strip portions 17, 17' are shaped in a load- and/or noise-optimized manner in accordance with the occurring forces. Use is made for this purpose of measurement results from which force progressions and/or excitation frequencies can be determined.

With the above-described pad backplate 6, it is possible to achieve a weight-reduced application-side brake pad 12*a* which are used in different brakes, as the following table shows.

TABLE 1

| Pad backplate weight and use | | | |
|---|---|---|---|
| Weight [g] | Area [cm²] | Braking torque [kNm] | Full area [cm²] |
| 1050 | 189 | 30 | 196 |
| 950 | 142.5 | 19 | 148 |
| 900 | 115 | 13 | 119 |
| 1000 | 164 | 24 | 173 |
| 1000 | 161 | 20 | 168 |
| 1200 | 200.7 | 30 | 208 |
| 1000 | 154-161 | 19 | 171 |

The term "full area" within the context of the present invention defines an area in the state of wear. In the state of wear, the frictional mass only still has a pad thickness of 2 mm.

The "area" listed in the table refers to an area with average wear, i.e. when the pad is half worn.

The invention is not restricted by the above-described exemplary embodiments but rather can be modified within the scope of the appended claims.

For example, it is conceivable for the supporting strip portions 17, 17' to also be connected to the pressure portions 13, 13' via corresponding stiffening web or ribs.

From the context of the present invention, it goes without saying that the pad backplate 60 together with the frictional mass 50 of the brake pad 12b can preferably be formed analogously to the pad backplate 6 together with the frictional mass 5 of the brake pad 12a, and therefore in particular the weight advantages of the brake pad 12a that are brought about by the structural arrangement are also produced for the brake pad 12b.

LIST OF REFERENCE SIGNS

1 Disk brake
2 Brake disk
2a Brake disk axis of rotation
3 Brake carrier
3a, 3'a Brake carrier horn
4 Brake caliper
5, 50 Frictional mass
6, 60 Pad backplate
6a Pad side
6b Application side
6c, 6'c Contact surface
6d, 6'c Supporting surface
6e Supporting surface
6f-i Side surface
7, 7' Pressure piece
8, 8' Brake plunger
9 Crosspiece
10 Brake rotary lever
11 Application device
12 Brake pad set
12a, 12b Brake pad
13, 13' Pressure portion
13a, 13'a Recess
13b, 13'b Annular width
14, 14b, 14c, 14'c Web portion
14a Web width
15, 15' Stiffening portion
16, 16' Contact strip portion
17, 17' Supporting strip portion
19 Surface
18a, 18b Surface portion
19, 19' Contact region
19a, 19'a Supporting region
20 Structural arrangement
21, 21' Structural element
21a, 21'a Edge
21b, 21'b Recess
21c Base surface of the recess
22, 22' Elevation
22a, 22'a Depression
23, 24, 25, 25a Edge portion
26 Surface
27, 27' Stiffening portion
27a-27d, 27'a-27'd Web stiffening portion
28, 28' Web
28a, 28c Annular web portion
28b, 28b1 Spoke web portion
29, 29a, 29', 29'a Structural element
30 Honeycomb structural element
31, 31', 31a, 31'a, Annular segment structural element
32, 32', 32a, 32'a,
33, 33',
34, 34', 34a, 34'a
35, 35' Annular structural element
36, 36', 37, 37' Structural element
38, 38', 38a, 38'a Annular segment pressure portion
38b, 38'b, 38c, 38'c Depression
39, 39', 39a, 39b Web portion
40 Thickness
41 Height
42 Excess length
43 Depth
50 Frictional mass
55 Bearing
60 Pad backplate
65 Rounding
66 Edge region
70 Height
80 Width of a web
90 Length of a web
114 Web portion
R1, R2 Row
S Axis
A Plane of the surface
M Center line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad for a disk brake for a utility vehicle, comprising:
   a pad backplate, which has a pad side with a frictional mass and an application side opposite the pad side, wherein
   the pad side is provided with a structural arrangement having a plurality of recesses with elevations arranged therein, and
   the structural arrangement of the pad side comprises structural elements which differ in shape and size, wherein
   a first group of structural elements of the structural elements, which differ in shape and size, of the structural arrangement are arranged in two straight rows, which run parallel to a longitudinal direction of the pad backplate, and in an arrangement running around said rows, and
   the first straight row has three hexagonal honeycomb structural elements next to one another, and in the second straight row lying thereunder, at least two further honeycomb structural elements are arranged in such a manner that a type of honeycomb structure results.

2. A brake pad for a disk brake of a utility vehicle, as claimed in claim 1, wherein a form-fitting connection is provided to the frictional mass, and wherein the brake pad is configured for disk brakes with a braking torque of a maximum of 24 kNm and with a frictional surface of the brake pad of more than 160 cm2, in particular 164 cm2, and has a weight of the pad backplate of less than 1050 g, in particular 1000 g.

3. The brake pad as claimed in claim 1, wherein the structural elements in the two straight rows and in the arrangement running around said rows are arranged in an arrangement which is symmetrical with respect to an axis which runs perpendicularly to the longitudinal direction of the pad backplate.

4. A brake pad for a disk brake of a utility vehicle, as claimed in claim 1, wherein a form-fitting connection is provided to the frictional mass, and wherein the brake pad is configured for disk brakes with a braking torque of a maximum of 20 kNm and with a frictional surface of the brake pad of more than 155 cm2, in particular 161 cm2, and has a weight of the pad backplate of less than 1050 g, in particular 1000 g.

5. A brake pad for a disk brake of a utility vehicle, as claimed in claim 1, wherein a form-fitting connection is provided to the frictional mass, and wherein the brake pad is configured for disk brakes with a braking torque of a maximum of 19 kNm and with a frictional surface of the brake pad of more than 150 cm2, in particular 154-161 cm2, and has a weight of the pad backplate of less than 1050 g, in particular 1000 g.

6. A brake pad for a disk brake of a utility vehicle, as claimed in claim 1, wherein a form-fitting connection is provided to the frictional mass, and wherein the brake pad is configured for disk brakes with a braking torque of a maximum of 19 kNm and with a frictional surface of the brake pad of more than 140 cm2, in particular 142.5 cm2, and has a weight of the pad backplate of less than 1000 g, in particular 950 g.

7. A brake pad for a disk brake of a utility vehicle, as claimed in claim 1, wherein a form-fitting connection is provided to the frictional mass, and wherein the brake pad is configured for disk brakes with a braking torque of a maximum of 13 kNm and with a frictional surface of the brake pad of more than 110 cm2, in particular 115 cm2, and has a weight of the pad backplate of less than 950 g, in particular 900 g.

8. A brake pad for a disk brake of a utility vehicle, as claimed in claim 1, wherein a form-fitting connection is provided to the frictional mass, and wherein the brake pad is configured for disk brakes with a braking torque of a maximum of 30 kNm and with a frictional surface of the brake pad of more than 185 cm2, in particular 200.7 cm2, and has a weight of the pad backplate of less than 1250 g, in particular 1200 g.

9. A brake pad set for a disk brake of a utility vehicle, wherein the brake pad set comprises at least one application-side brake pad and at least one back-side brake pad, and the application-side brake pad is designed as claimed in claim 8.

10. A brake pad set for a disk brake for a vehicle, wherein the two brake pads are designed as claimed in claim 8.

11. The brake pad as claimed in claim 8 wherein the utility vehicle is a truck, a utility vehicle for transporting people, a utility vehicle for emergency personnel, forklift trucks, dumper trucks and/or a tractor.

12. The brake pad as claimed in claim 1, wherein, in addition to the first group, further groups or individual structural elements of the structural elements, which differ in shape and size, of the structural arrangement are provided in edge regions, in the center and in support regions of the pad backplate.

13. The brake pad as claimed in claim 12, wherein the structural arrangement also has structural elements of the structural elements, which differ in shape and size, with pentagonal, square and/or triangular shapes with rounded corners.

14. The brake pad as claimed in claim 13, wherein the elevations are of circular, oval, triangular, or/and polygonal design, and have depressions.

15. The brake pad as claimed in claim 14, wherein the elevations protrude from a base of a respective recess as far as the height of a respective edge or/and beyond the respective edge.

16. The brake pad as claimed in claim 15, wherein the application side of the pad backplate has protruding pressure portions.

17. The brake pad as claimed in claim 16, wherein the pressure portions protruding from the application side are connected by at least one web portion.

18. The brake pad as claimed in claim 17, wherein the at least one web portion runs rectilinearly and parallel to a longitudinal direction of the pad backplate.

19. The brake pad as claimed in claim 18, wherein the pressure portions are of circular ring-shaped design with a recess.

20. The brake pad as claimed in claim 19, wherein the pressure portions are each divided into two semicircular annular segment pressure portions, in the center of which a circular depression is in each case formed, said depression communicating on both sides with a respective rectilinear depression between the associated annular segment pressure portions.

21. The brake pad as claimed in claim 20, wherein the rectilinear depressions run in an imaginary straight connecting line in the longitudinal direction of the pad backplate through center points of the annular segment pressure portions.

22. The brake pad as claimed in claim 21, wherein the application side has contact strip portions and supporting strip portions.

23. The brake pad as claimed in claim 22, wherein the contact strip portions are connected to the pressure portions or to the annular segment pressure portions.

24. The brake pad as claimed in claim 23, wherein the pad backplate is produced integrally, in particular monolithically, from a metallic casting.

25. The brake pad as claimed in claim 24, wherein x is the depth of at least one recess of the structural arrangement, and y is the thickness of the pad backplate, wherein the ratio x/y is between 0.25 to 0.6.

26. The brake pad as claimed in claim 25, wherein the width of at least 50% of all of the webs of the structural arrangement, in particular of at least 50% of all of the webs with a uniform length, is between 1.8 mm and 4 mm.

27. The brake pad as claimed in claim 26, wherein the length of at least 50% of all of the webs of the structural arrangement, in particular of at least 50% of all of the webs of the structural arrangement with a uniform width, is between 7 mm and 17 mm.

28. The brake pad as claimed in claim 27, wherein a number of structural elements are more than 8 per 100 cm2 of frictional surface.

29. The brake pad as claimed in claim 28, wherein the structural elements are designed as the recesses, wherein the recesses have the elevations which, in a top view perpendicular to the plane of the surface of the pad backplate, take up between 15 to 50%, in particular between 20% and 30%, of the area of the recess.

30. The brake pad as claimed in claim 29, wherein the recess has a maximum depth by which it is lowered in relation to the plane of the surface wherein maximum depth is between 20 to 60%, in particular 30 to 50%, of the thickness of the pad back disk.

31. The brake pad as claimed in claim 30, wherein the elevations have a height by which they protrude, perpendicularly, from the base surface of the recess, wherein the height is between 80% to 180%, in particular between 120% to 165%, of the depth.

32. The brake pad as claimed in claim 31, wherein at least 50% of the webs along a portion of at least 50% of their main direction of extent a width which is between 70-130% of the depth of the recess.

33. The brake pad as claimed in claim 32, wherein the length of at least 50% of all of the webs along their main direction of extent is between 120% and 300% of the thickness of the pad backplate.

34. The brake pad as claimed in claim 33, wherein at least 50% of all of the webs have a uniform length.

35. The brake pad as claimed in claim 34, wherein the elevations are spaced apart by a minimum distance from the one edge bounding the recess.

36. The brake pad as claimed in claim 35, wherein the web portion runs as the first web portion between the pressure portions with a web width which is between 40-55% of an outer radius of one of the pressure portions.

37. The brake pad as claimed in claim 36, wherein a second web portion runs between the pressure portions and is arranged mirror-symmetrically with respect to the first web portion, with reference to an imaginary center axis M.

38. The brake pad as claimed in claim 37, wherein the second web portion has a width between 90% and 105%, of the first web portion.

39. The brake pad as claimed in claim 38, wherein a surface of the pad side of the brake pad backplate forms edge region running around the structural arrangement.

40. The brake pad as claimed in claim 39, wherein the edge region on all of the portions has a width between 3 mm and 12 mm.

41. The brake pad as claimed in claim 40, wherein at least 50% of all of the elevations, of the structural arrangement each has at least one depression, in particular a depression arranged centrally in the elevation.

42. The brake pad as claimed in claim 41, wherein the elevations have at least two different geometrical shapes and/or dimensions.

43. The brake pad as claimed in claim 42, wherein each elevation has the geometrical shape of the respective recess in which the elevation is arranged, in such a manner that the elevation is spaced apart at a constant distance from the edge of the recess.

44. The brake pad as claimed in claim 43, wherein a maximum of two elevations are arranged in each recesses.

45. The brake pad as claimed in claim 44, wherein the recesses take up between 55-85% of the surface of the structural arrangement in the top view of the pad side.

46. The brake pad as claimed in claim 45, wherein the recesses take up between 70-90% of the surface of the pad backplate in the top view of the pad side.

47. The brake pad as claimed in claim 46, wherein the structural arrangement takes up between 65% and 75%, of the surface of the pad backplate in the top view of the pad side.

48. A brake pad for a disk brake of a utility vehicle as claimed in claim 1, wherein a form-fitting connection is provided to the frictional mass, and wherein the brake pad is configured for disk brakes with a braking torque of a maximum of 30 kNm and with a frictional surface of the brake pad of more than 180 cm2, in particular 189 cm2, and has a weight of the pad backplate of less than 1100 g, in particular of 1050 g.

* * * * *